(12) United States Patent
Boyapalle et al.

(10) Patent No.: US 11,595,837 B2
(45) Date of Patent: Feb. 28, 2023

(54) ENDPOINT COMPUTING DEVICE MULTI-NETWORK SLICE REMEDIATION/PRODUCTIVITY SYSTEM

(71) Applicant: Dell Products L.P., Round Rock, TX (US)

(72) Inventors: Anantha Boyapalle, Cedar Park, TX (US); Michael S. Gatson, Austin, TX (US); Abeye Teshome, Austin, TX (US)

(73) Assignee: Dell Products L.P., Round Rock, TX (US)

(*) Notice: Subject to any disclaimer, the term of this patent is extended or adjusted under 35 U.S.C. 154(b) by 95 days.

(21) Appl. No.: 16/776,278

(22) Filed: Jan. 29, 2020

(65) Prior Publication Data
US 2021/0235290 A1 Jul. 29, 2021

(51) Int. Cl.
*H04W 24/04* (2009.01)
*H04W 76/11* (2018.01)
(Continued)

(52) U.S. Cl.
CPC ......... *H04W 24/04* (2013.01); *G06F 11/1441* (2013.01); *H04L 41/0654* (2013.01);
(Continued)

(58) Field of Classification Search
CPC ..... H04W 24/04; H04W 76/18; H04W 76/11; H04W 36/14; H04W 88/18; H04W 88/06;
(Continued)

(56) References Cited

U.S. PATENT DOCUMENTS 10,936,422 B1* 3/2021 Paczkowski ........ G06F 11/1417
2013/0024680 A1* 1/2013 Heidingsfeld ...... G06F 16/1767
713/2

(Continued)

OTHER PUBLICATIONS

3GPP TS 23.501 Technical Specification Group Services and System Aspects; System Architecture for the 5G System; Stage 2 (Release 16),Dec. 2019. Section 5.15.1, p. 188. (Year: 2019).*

*Primary Examiner* — Jason E Mattis
*Assistant Examiner* — Robert Ma
(74) *Attorney, Agent, or Firm* — Joseph Mencher

(57) ABSTRACT

An endpoint computing device multi-network slice remediation/productivity system includes a core network system coupled to a RAN system and configured to allocate network slices and make them available for use in wireless communications via the RAN system. While operating in a pre-boot environment, an endpoint computing device determines that it is unable to transition to operating in a runtime environment and, in response, establishes a remediation network connection with a first network slice, and establishes a productivity network connection with a second network slice. While operating in a pre-boot environment and performing the remediation operations, the endpoint computing device then performs remediation operations via remediation wireless communications over the remediation network connection with the first network slice, and provides access to productivity application(s) that are configured to allow a user to perform productivity operations via productivity wireless communications over the productivity network connection with the second network slice.

20 Claims, 14 Drawing Sheets

(51) Int. Cl.

| | |
|---|---|
| *H04W 36/14* | (2009.01) |
| *H04W 76/18* | (2018.01) |
| *H04L 41/0654* | (2022.01) |
| *H04W 88/18* | (2009.01) |
| *H04W 88/06* | (2009.01) |
| *H04L 9/40* | (2022.01) |
| *G06F 11/14* | (2006.01) |

(52) U.S. Cl.
CPC ......... *H04L 63/0892* (2013.01); *H04W 36/14* (2013.01); *H04W 76/11* (2018.02); *H04W 76/18* (2018.02); *H04W 88/06* (2013.01); *H04W 88/18* (2013.01)

(58) Field of Classification Search
CPC ............. H04L 41/0654; H04L 63/0892; G06F 11/1441
See application file for complete search history.

(56) References Cited

U.S. PATENT DOCUMENTS

| | | | |
|---|---|---|---|
| 2017/0111388 A1* | 4/2017 | Mehta | ................... G06F 21/572 |
| 2017/0164212 A1 | 6/2017 | Opsenica et al. | |
| 2017/0257769 A1 | 9/2017 | Haugen et al. | |
| 2019/0251241 A1* | 8/2019 | Bykampadi | ........... H04L 9/0825 |
| 2019/0294490 A1* | 9/2019 | Zhang | ................. G06F 11/1441 |
| 2020/0037146 A1* | 1/2020 | Salkintzis | ......... H04W 36/0027 |
| 2020/0053083 A1* | 2/2020 | Kunz | ................. H04L 63/0892 |
| 2020/0053531 A1* | 2/2020 | Myhre | ................. H04W 48/18 |
| 2021/0126856 A1* | 4/2021 | Muthukaruppan | ......................... H04L 41/0806 |

* cited by examiner

ENDPOINT COMPUTING DEVICE MULTI-NETWORK SLICE REMEDIATION/PRODUCTIVITY SYSTEM

BACKGROUND

The present disclosure relates generally to information handling systems, and more particularly to endpoint information handling systems utilizing multiple network slices to perform both remediation operations and productivity operations.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices, networking computing devices, storage systems, desktop computing devices, laptop/notebook computing devices, tablet computing devices, mobile phones, and/or other computing devices known in the art, sometimes experience issues that prevent that computing device from booting or otherwise initializing to provide an operating system on the computing device such that the computing device may enter a computing device runtime environment from a computing device pre-boot environment. In such situations, conventional computing device remediation systems may provide the computing device with the ability to access support services to attempt to remediate the issues with the computing device while the computing device is in the computing device pre-boot environment.

For example, conventional computing device remediation systems may detect when the computing device is unable to enter the runtime environment (e.g., due to any of a variety of issues that prevent the operating system from being provided) from the computing device pre-boot environment and, in response, may provide that computing device in a quarantined state while establishing a quarantine network connection that provides for limited networking operations (e.g., networking operations that may be limited to connecting to the support service.) The conventional computing device remediation system may then allow the user to connect to the support service via the quarantine network connection, and operate with the support service to attempt to remediate the issues occurring with the computing device so that the computing device may subsequently boot the operating system and enter the runtime environment. However, such remediation operations can sometimes take a significant amount of time during which the computing device is unavailable for use, and the limited networking operations allowed by the quarantine network connection (and the limited operations allowed in the quarantine state) do not allow for any uses of the computing device other than those associated with the remediation operations. As such, conventional computing device remediation systems may result in significant downtime and/or unavailability of their computing devices in the event remediation of issues associated with those computing device is required.

Accordingly, it would be desirable to provide a computing device remediation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a network slice remediation/productivity engine that is configured, while operating in a pre-boot environment, to: determine an inability to transition to operating in a runtime environment and, in response: establish a remediation network connection with a first network slice included in a plurality of network slices that are available via a Radio Access Network (RAN) system; establish a productivity network connection with a second network slice included in the plurality of network slices that are available via the RAN system; perform, via remediation wireless communications over the remediation network connection with the first network slice, remediation operations; and provide, via productivity wireless communications over the productivity network connection with the second network slice while performing the remediation operations, access to at least one productivity application that is configured to allow a user to perform productivity operations.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
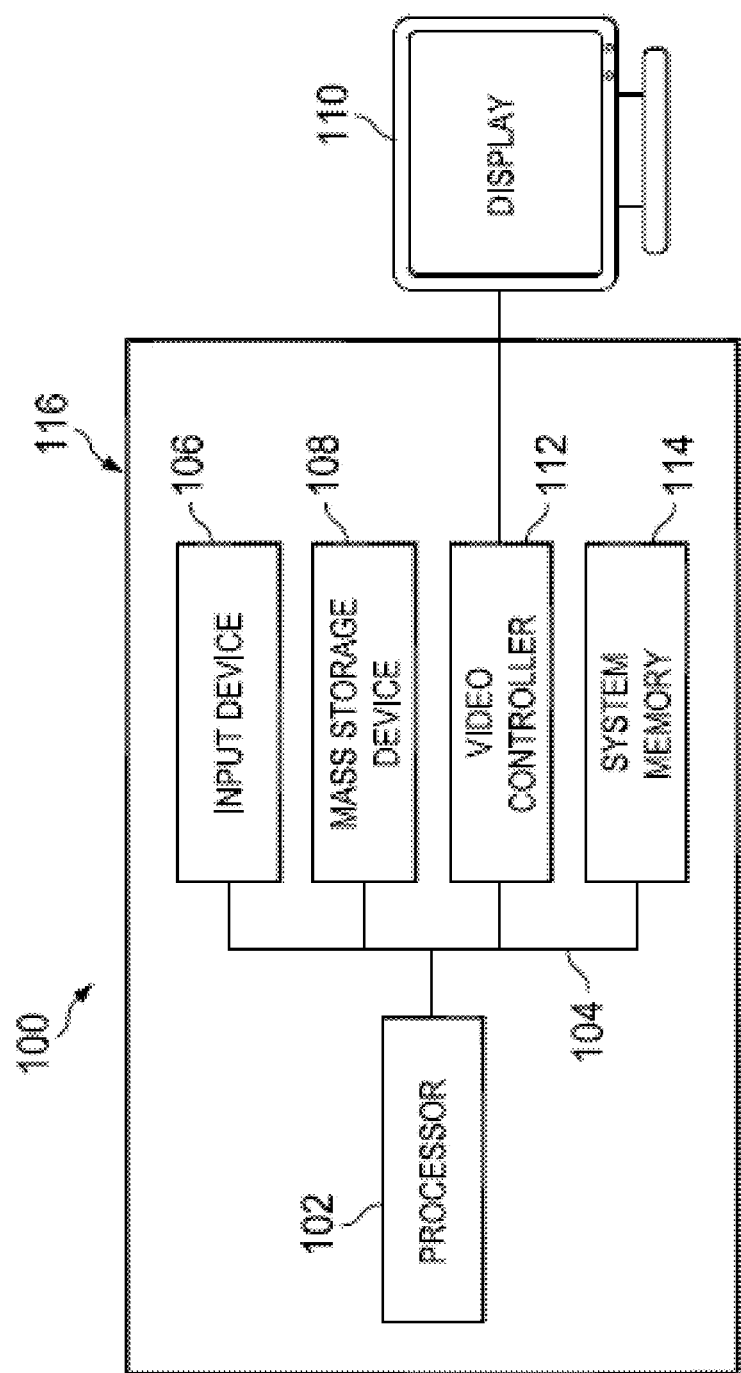
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
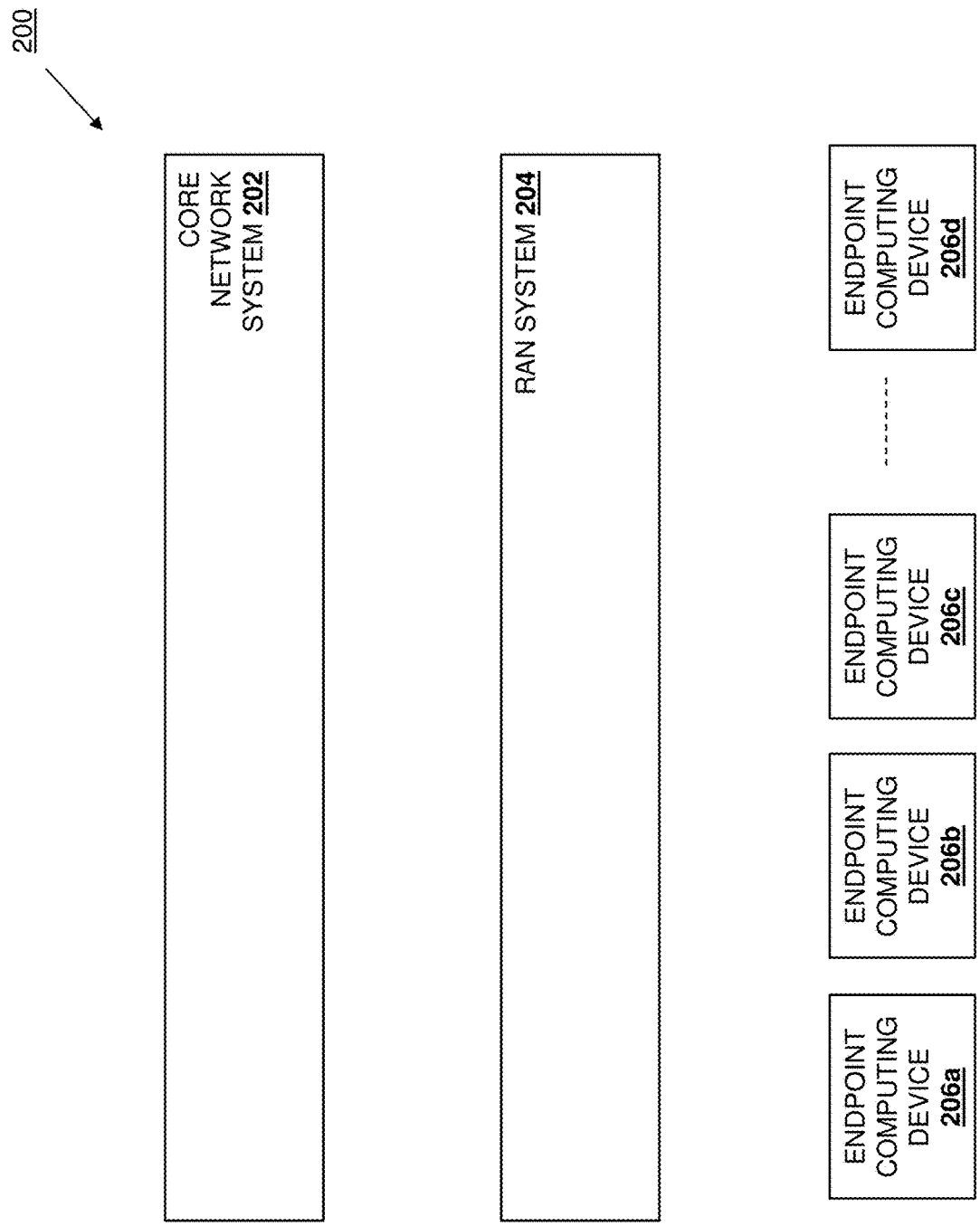
FIG. 2 is a schematic view illustrating an embodiment of an endpoint computing device multi-network slice utilization system.

Referring now to FIG. 2, an embodiment of an endpoint computing device multi-network slice utilization system 200 is illustrated. In the illustrated embodiment, the endpoint computing device multi-network slice utilization system 200 incudes a core network system 202. In an embodiment, the core network system 202 may be provided by the IHS 100 discussed above with reference to FIG. 1, and/or may include some or all of the components of the IHS 100, and in specific examples may include server devices, switch devices, storage devices, and/or other core network system components connected together to provide a 5G core network system that may be operated by a wireless provider (e.g., AT&T® Mobility of Atlanta, Ga., United States; SPRINT® Corporation of Overland Park, Kans., United States; VERIZON® Wireless of New York, N.Y., United States; etc.) and may include any combination of physical and/or virtual components that are configured to provide 5G wireless communications. However, while illustrated and discussed as physical and/or virtual components that provide 5G wireless communications, one of skill in the art in possession of the present disclosure will recognize that other components and/or component configurations may be utilized in a core network system to provide other wireless communications capabilities (e.g., 4G wireless communications) while remaining within the scope of the present disclosure as well.

In the illustrated embodiment, the endpoint computing device multi-network slice utilization system 200 also includes a Radio Access Network (RAN) system 204. In an embodiment, the RAN system 204 may be provided by the IHS 100 discussed above with reference to FIG. 1, and/or may include some or all of the components of the IHS 100, and may include radio/cellular towers, base stations, antennas, core network interface devices, and/or any other RAN subsystems that would be apparent to one of skill in the art in possession of the present disclosure. In a specific example, the RAN system 204 may be a 5G RAN system including cellular towers that are configured to provide for wireless communications by endpoint computing devices utilizing network slices/spectrum allocated by the 5G core network system discussed above. or example, the RAN system 204 may provide an orchestration layer for wireless communications between communication devices and cellular towers, allowing wireless communications to then be exchanged by a RAN controller in the RAN system 204 via a Software Defined Networking (SDN) switch device and a separate control-based interface, the separation of which allows the RAN system 204 to be flexible and accommodate Network Function Virtualization (NFV) techniques utilized in 5G communications.

Furthermore, the endpoint computing device multi-network slice utilization system 200 also include a plurality of endpoint computing devices 206a, 206b, 206c, and up to 206d, each of which may be provided by the IHS 100 discussed above with reference to FIG. 1, and/or may include some or all of the components of the IHS 100. In a specific example, the endpoint computing devices 206a-206d may be provided by mobile phones, tablet computing devices, laptop/notebook computing devices, IoT computing devices, and/or any other endpoint computing devices that would be apparent to one of skill in the art in possession of the present disclosure. However, while a specific endpoint computing device multi-network slice utilization system 200 has been illustrated and described, one of skill in the art in possession of the present disclosure will recognize that the endpoint computing device multi-network slice utilization system of the present disclosure may include a variety of components and component configurations while remaining within the scope of the present disclosure as well.

Figure 3:
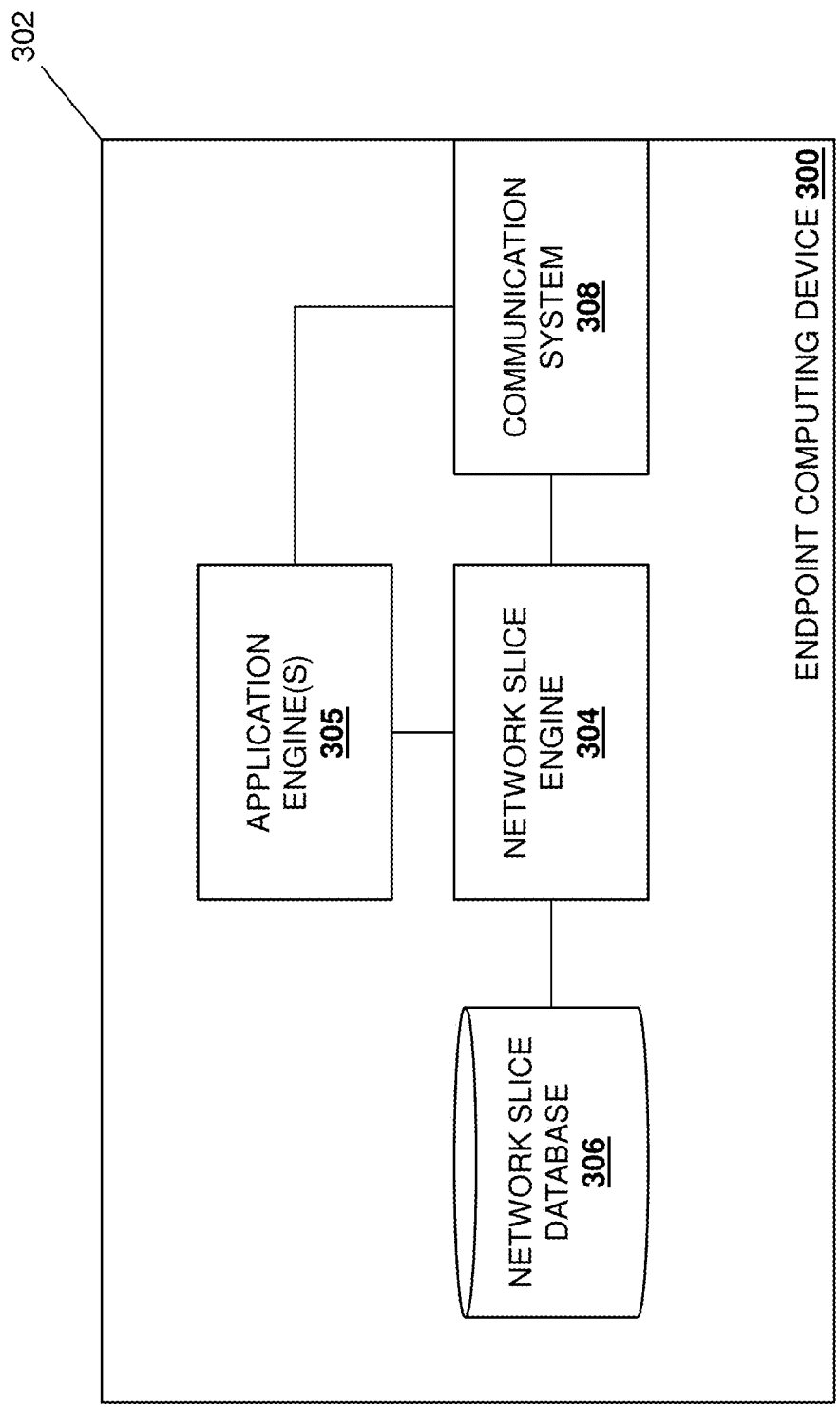
FIG. 3 is a schematic view illustrating an embodiment of an endpoint computing device that may be provided in the endpoint computing device multi-network slice utilization system of FIG. 2.

Referring now to FIG. 3, an embodiment of an endpoint computing device 300 is illustrated that may provide any or all of the endpoint computing devices 206*a*-206*d* discussed above with reference to FIG. 2. As such, the endpoint computing device 300 may be provided by the IHS 100 discussed above with reference to FIG. 1 and/or may include some or all of the components of the IHS 100, and in specific examples may be provided by mobile phones, tablet computing devices, laptop/notebook computing devices, IoT computing devices, and/or any other endpoint computing devices that would be apparent to one of skill in the art in possession of the present disclosure. Furthermore, while illustrated and discussed as an endpoint computing device 300, one of skill in the art in possession of the present disclosure will recognize that the functionality of the endpoint computing device 300 discussed below may be provided by other devices that are configured to operate similarly as the endpoint computing device 300 discussed below.

In the illustrated embodiment, the endpoint computing device 300 includes a chassis 302 that houses the components of the endpoint computing device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network slice engine 304 that is configured to perform the functionality of the network slice engines and/or computing devices discussed below. Furthermore, the memory system may also include instructions that, when executed by the processing system, cause the processing system to provide an application engine 305 that is configured to provide any or all of the applications discussed below as operating on the endpoint computing device 300.

The chassis 302 may also house a storage system (not illustrated, but which may include the storage 108 discussed above with reference to FIG. 1) that is coupled to the network slice engine 304 (e.g., via a coupling between the storage system and the processing system) and that includes a network slice database 306 that is configured to store any of the information utilized by the network slice engine 304 discussed below. The chassis 302 may also house a communication system 308 that is coupled to the network slice engine 304 and the application engine 305 (e.g., via a coupling between the communication system 308 and the processing system) and that may be provided by a Network Interface Controller (NIC), wireless communication systems (e.g., cellular wireless components (e.g., 5G cellular wireless components, BLUETOOTH® components, Near Field Communication (NFC) components, WiFi components, etc.), and/or any other communication components that would be apparent to one of skill in the art in possession of the present disclosure. However, while a specific endpoint computing device 300 has been illustrated, one of skill in the art in possession of the present disclosure will recognize that endpoint computing devices (or other devices operating according to the teachings of the present disclosure in a manner similar to that described below for the endpoint computing device 300) may include a variety of components and/or component configurations for providing conventional endpoint computing device functionality, as well as the functionality discussed below, while remaining within the scope of the present disclosure as well.

Figure 4:
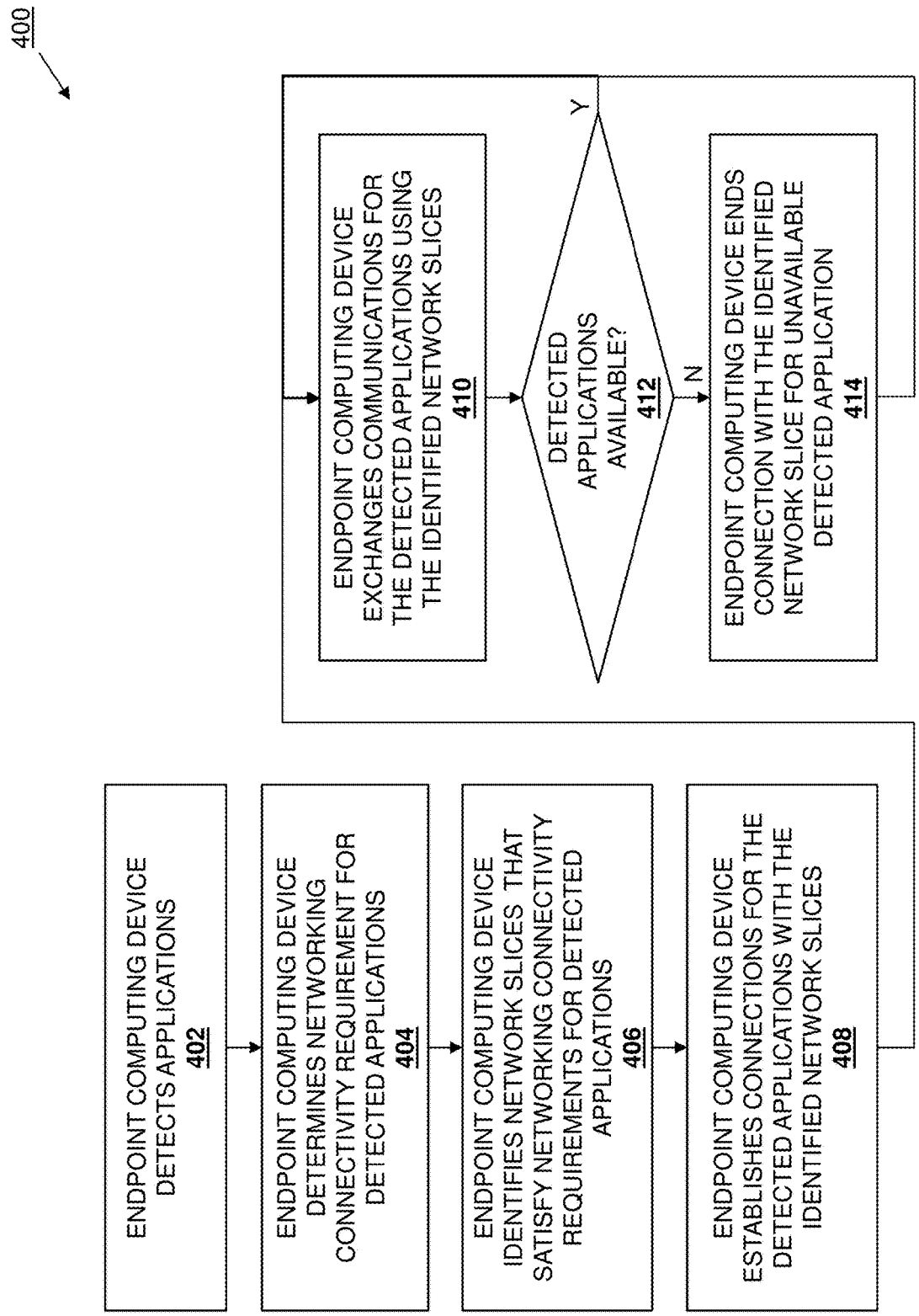
FIG. 4 is a flow chart illustrating an embodiment of a method for utilizing multiple network slices by an endpoint computing device.

Referring now to FIG. 4, an embodiment of a method 400 for utilizing multiple network slices for an endpoint computing device is illustrated. As discussed below, the systems and methods of the present disclosure provide for the utilization of respective network slices for different functionality (e.g., different applications, different workloads, etc.) provided on any particular endpoint computing device. For example, a core network system that is coupled to a RAN system may allocate a plurality of a network slices and make each of the plurality of network slices available for use in wireless communications via the RAN system. An endpoint computing device may include first and second applications that are configured to operate on the endpoint computing device, and the endpoint computing device may detect each of the first application and the second application, determine a first networking connectivity requirement for the first application, and determine a second networking connectivity requirement for the second application. The endpoint computing device may then identify a first network slice that is allocated by the core network system, available via the RAN system, and that satisfies the first networking connectivity requirement for the first application. The endpoint computing device may also identify a second network slice that is allocated by the core network system, available via the RAN system, and that satisfies the second networking connectivity requirement for the second application. Then endpoint computing device then establishes a first connection for the first application with the first network slice, and establishes a second connection for the second application with the second network slice. Subsequently, the first application may exchange first communications via the RAN system and the core network system using the first network slice, and the second application may exchange second communications via the RAN system and the core network system using the second network slice. As such, network slicing is extended to general purpose endpoint computing devices running applications (or workloads) with different networking connectivity requirements by providing for the utilization of a respective network slice by each of those applications, thus optimizing the networking connectivity of the general purpose endpoint computing device on a per-application/per-workload/per functionality basis.

Figure 5:
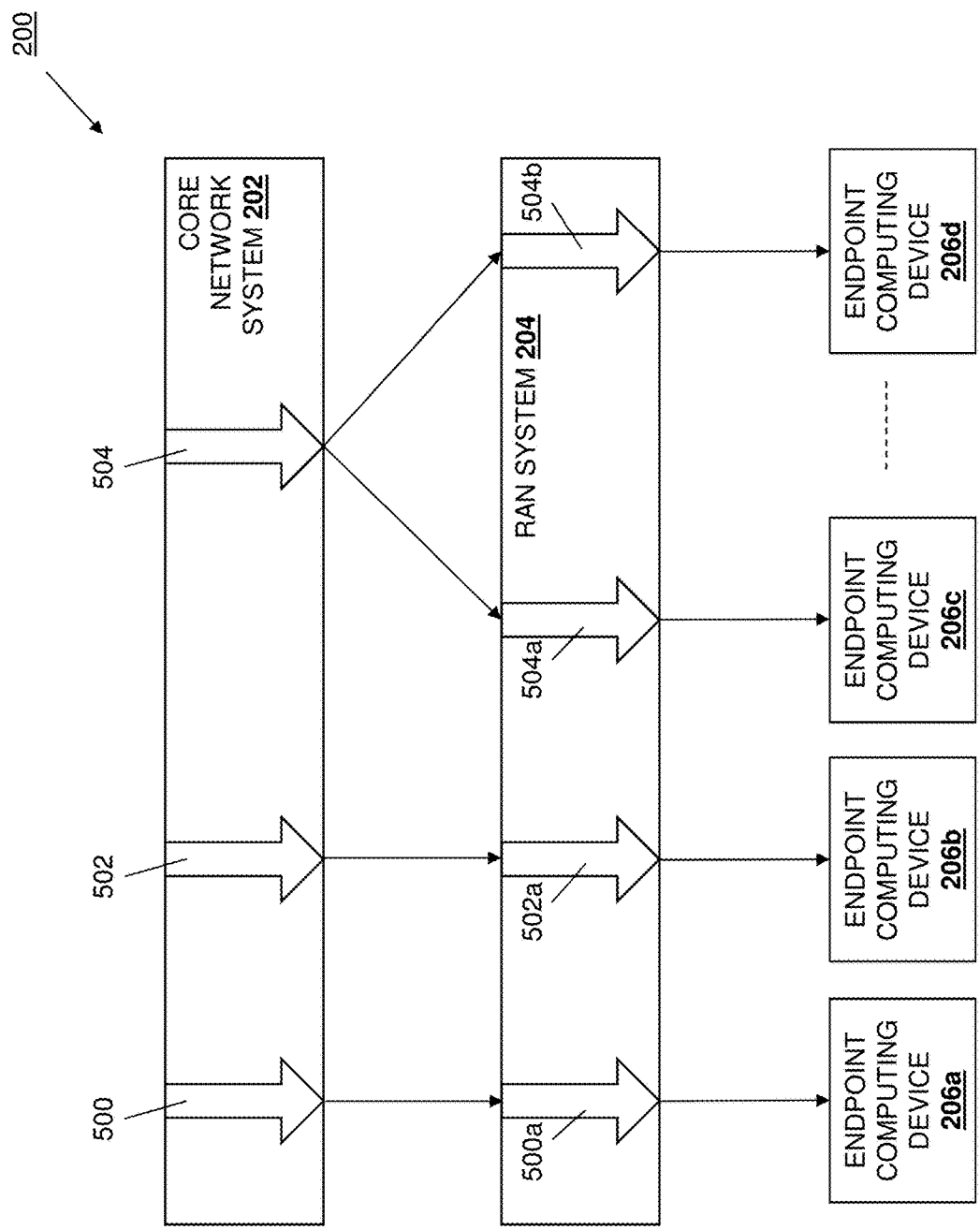
FIG. 5 is a schematic view illustrating an embodiment of a conventional endpoint computing device network slice utilization system.

With reference to FIG. 5, an embodiment of conventional endpoint computing device network slicing functionality using the endpoint computing device multi-network slice utilization system 200 of FIG. 2 is illustrated for purposes of discussion and to contrast the endpoint computing device multi-network slice functionality of the present disclosure. As illustrated in FIG. 5, the core network system 202 (e.g., a 5G core network system) may operate to allocate network slices and make those network slices available to via the RAN system 204 (e.g., a 5G RAN system) for use in wireless communications. For example, arrows are provided within the core network system 202 in FIG. 5 to represent portions of spectrum that are available to the core network system 202, including a spectrum portion 500, a spectrum portion 502, and a spectrum portion 504 in the illustrated embodiment.

Furthermore, the allocation of network slices and the making of those network slices available via the RAN system 204 for use in wireless communications by the core network system 202 is illustrated in FIG. 5 by arrows provided in the RAN system 204, and may include the core network system 202 allocating a network slice 500*a* from the spectrum portion 500 (as illustrated by the arrow between the spectrum portion 500 and the network slice 500*a*), allocating a network slice 502*a* from the spectrum portion 502 (as illustrated by the arrow between the spectrum portion 502 and the network slice 502*a*), and allocating network slices 504*a* and 504*b* from the spectrum portion 504 (as illustrated by the respective arrow between the spectrum portion 504 and the network slices 504*a* and 504*b*). One of skill in the art in possession of the present disclosure would recognize that the allocation of network slices by a core network system, and the making of those network slices available by the core network system via a RAN system, may include a variety of conventional operations, and thus is not described herein in detail. Furthermore, one of skill in the art in possession of the present disclosure will appreciate that each network slice 500*a*, 502*a*, 504*a*, and 504*b* may provide particular networking characteristics including particular data transmission latency, particular data transmission throughput/bandwidth, particular data transmission reliability, other particular Quality of Service (QoS) characteristics, and/or other particular networking characteristics that would be apparent to one of skill in the art in possession of the present disclosure.

As also illustrated in FIG. 5, each of the endpoint computing devices 206*a*-206*d* may then operate to connect to a respective network slice in order to utilize that network slice for exchanging wireless communications via the RAN system 204 and the core network system 202 (i.e., wireless communications with other endpoint computing devices coupled to the RAN system 204, other endpoint devices coupled to a network that is coupled to the core network system 202, etc.) One of skill in the art in possession of the present disclosure would recognize that the connection to a network slice by an endpoint computing device, and the exchange of communications via a RAN system and core network system by that endpoint computing device using that network slice, may include a variety of conventional operations, and thus is not described herein in detail. As discussed above, the conventional endpoint computing device network slicing illustrated in FIG. 5 and described above tends to work well for "single-function" computing devices such as IoT computing devices (e.g., IoT power meter devices), autonomous driving computing device, factory automation computing devices, and/or other single-function endpoint computing devices known in the art that include particular networking connectivity requirements, as the networking characteristics of a single network slice to which an endpoint computing device conventionally connects do not substantially change during the networking session associated with that connection.

However, the conventional endpoint computing device network slicing illustrated in FIG. 5 and described above introduces inefficiencies when utilized with general purpose endpoint computing devices such as laptop/notebook computing devices, tablet computing devices, and mobile phones that provide multiple functions (e.g., via multiple applications operating on those general purpose endpoint computing devices), as the conventional provisioning of a conventional network slice with networking characteristics that satisfy a particular networking connectivity requirement to such general purpose endpoint computing devices will often result in a networking connection that is non-optimal for at least some of the functionality provided by the general purpose endpoint computing device (e.g., at least some of the applications or workloads operating on the general purpose endpoint computing device.) As described below, the endpoint computing device multi-network slice utilization systems and methods of the present disclosure remedy such inefficiencies by allowing multiple separate endpoint computing device functionalities provided by a single endpoint computing device (e.g., applications, workloads, etc.) to each connect to and utilize a respective network slice that includes networking characteristics that satisfy the networking connectivity requirements of that endpoint computing device functionality.

The method 400 begins at block 402 where an endpoint computing device detects applications. In the specific example provided below, the method 400 is described as being performed by the endpoint computing device 206*a*. However, one of skill in the art in possession of the present disclosure will appreciate that the method 400 may be performed by any or all of the endpoint computing devices 206*a*-206*d* at the same (or different) times while remaining within the scope of the present disclosure as well. In an embodiment, at block 402, the application engine(s) 305 in the endpoint computing device 206*a*/300 may operate to provide one or more applications for operation on the endpoint computing device 206*a*/300. For example, at block 402, the application engine(s) 305 in the endpoint computing device 206*a*/300 may operate to provide a video communication application, an audio communication application, a video streaming application, an office productivity application, a gaming application, and/or any other applications that would be apparent to one of skill in the art in possession of the present disclosure. As would be appreciated by one of skill in the art in possession of the present disclosure, the applications provided at block 402 may operate to provide (or be replaced by) workloads operating on the endpoint computing device(s), as well as any other endpoint computing device functionality that one of skill in the art in possession of the present disclosure would recognize that benefitting from the dedicated network slices functionality described below.

As such, in an embodiment of block 402, the network slice engine 304 in the endpoint computing device 206*a*/300 may operate to detect the applications provided by the application engine(s) 305. For example, at block 402, the network slice engine 304 in the endpoint computing device 206*a*/300 may detect the applications provided by the application engine(s) 305 and operating on the endpoint computing device 206*a*/300 in response to the launching of those applications, in response to respective network connection requests received from those applications, and/or in response to any other application detection event that would be apparent to one of skill in the art in possession of the present disclosure. As such, continuing with the specific example provided above, at block 402, the network slice engine 304 in the endpoint computing device 206*a*/300 may detect a video communication application, an audio communication application, a video streaming application, an office productivity application, and/or a gaming application provided on the endpoint computing device 206*a*/300. However, while the method 400 is described as detecting applications at block 402, one of skill in the art in possession of the present disclosure will appreciate how workloads and/or other functionality provided on the endpoint computing device 206*a*/300 may be detected at block 402 while remaining within the scope of the present disclosure as well.

The method 400 then proceeds to block 404 where the endpoint computing device determines networking connectivity requirements for the detected applications. In an embodiment, at block 404, the network slice engine 304 in the endpoint computing device 206a/300 may operate to determine a networking connectivity requirement for each of the applications detected at block 402. In an embodiment, the determination of the networking connectivity requirements for an application by the network slice engine 304 in the endpoint computing device 206a/300 may include the application engine 305, which is providing an application, transmitting the networking connectivity requirements for that application to the network slice engine 304 (e.g., as IP header information in a data packet); the network slice engine 304 retrieving the networking connectivity requirements for an application (e.g., in response to the detection of that application) that may have been previously determined and stored in the network slice database 306 from the network slice database 306; and/or via any other networking connectivity requirement determination technique that would be apparent to one of skill in the art in possession of the present disclosure.

Continuing with the specific example provided above, at block 404, the network slice engine 304 in the endpoint computing device 206a/300 may operate to determine networking connectivity requirements for a video communication application detected at block 402 that includes a relatively high bandwidth networking connectivity requirement, a relatively low latency networking connectivity requirement, and a relatively high reliability networking connectivity requirement. Similarly, at block 404, the network slice engine 304 in the endpoint computing device 206a/300 may operate to determine networking connectivity requirements for an audio communication application detected at block 402 that includes a relatively low bandwidth networking connectivity requirement, a relatively low latency networking connectivity requirement, and a relatively high reliability networking connectivity requirements. Similarly, at block 404, the network slice engine 304 in the endpoint computing device 206a/300 may operate to determine networking connectivity requirements for a video streaming application detected at block 402 that includes a relatively high bandwidth networking connectivity requirement, a relatively intermediate latency networking connectivity requirement, and a relatively intermediate reliability networking connectivity requirement.

Similarly, at block 404, the network slice engine 304 in the endpoint computing device 206a/300 may operate to determine networking connectivity requirements for an office productivity application detected at block 402 that includes a relatively intermediate bandwidth networking connectivity requirement, a relatively low latency networking connectivity requirement, and a relatively low reliability networking connectivity requirements. Similarly, at block 404, the network slice engine 304 in the endpoint computing device 206a/300 may operate to determine networking connectivity requirements for a gaming application detected at block 402 that includes a relatively very high bandwidth networking connectivity requirement, a relatively very high latency networking connectivity requirement, and a relatively very high reliability networking connectivity requirement. However, while a few specific examples are provided, one of skill in the art in possession of the present disclosure will appreciate how different applications, workloads, and/or functionalities operating on and/or provided by an endpoint computing devices may include a variety of different networking connectivity requirements, and that any of those networking connectivity requirements may be determined at block 404 while remaining within the scope of the present disclosure as well.

Furthermore, in different embodiments, any particular application, workload, and/or functionality operating on the endpoint computing device 206a/300 may include multiple application subsystems, workload subsystems, and/or functionality subsystems that have different networking connectivity requirements (e.g., an application operating on the endpoint computing device 206a/300 may include a first application subsystem having a first networking connectivity requirement, a second application subsystem having a second networking connectivity requirement, and so on), and those applications subsystems, workload subsystems, and/or functionality subsystems may be detected at block 402 and their different networking connectivity requirements determined at block 404. Further still, in some embodiments, multiple applications operating on the endpoint computing device 206a/300 may include the same networking connectivity requirement (or respective networking connectivity requirements that fall within a particular networking connectivity requirement range) and, as such, those applications may be detected, the networking connectivity requirements of those applications may be determined, and those applications may be grouped in an application container that is associated with networking connectivity requirement (or networking connectivity requirement range) of those applications. Yet, further still, while the grouping of applications with the same or similar networking connectivity requirements into an application container is described as being performed during the method 400, the application containers discussed above as being associated with an networking connectivity requirement or networking connectivity requirement range may be determined prior to the method 400, stored in the network slice database 306, and identified at block 404 from that network slice database 306 while remaining within the scope of the present disclosure as well.

Figure 6A:
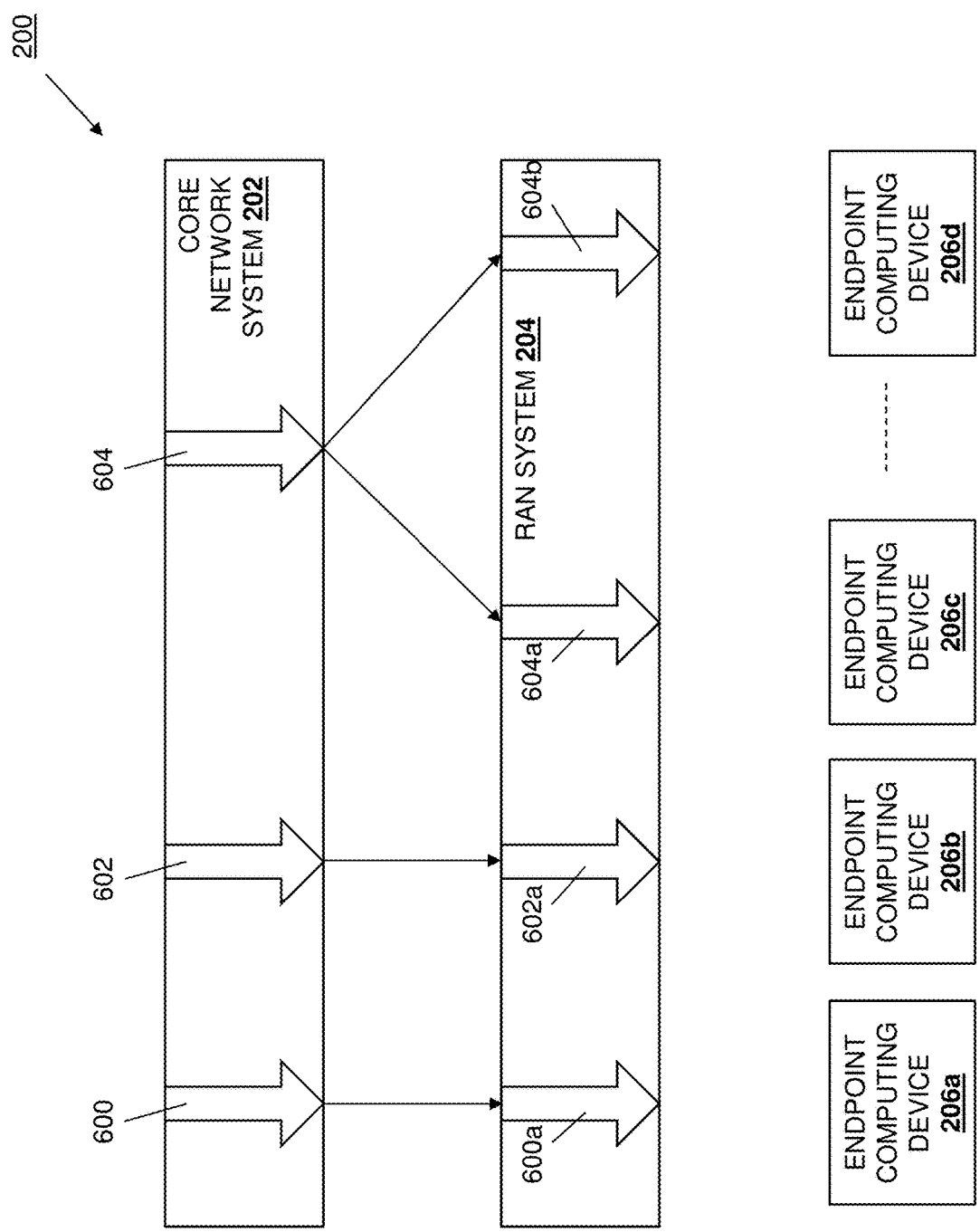
FIG. 6A is a schematic view illustrating an embodiment of the endpoint computing device multi-network slice utilization system of FIG. 2 operating during the method of FIG. 4.

The method 400 then proceeds to block 406 where the endpoint computing device identifies network slices that satisfy the networking connectivity requirements for the detected applications. In an embodiment, at block 406, the network slice engine 304 in the endpoint computing device 206a/300 may operate to identify a respective network slice that satisfies each networking connectivity requirement determined for each of the applications at block 404. With reference to FIG. 6A, the core network system 202 (e.g., a 5G core network system) may operate to allocate network slices and make those network slices available to via the RAN system 204 (e.g., a 5G RAN system) for use in wireless communications. For example, arrows are provided in the core network system 202 in FIG. 6A to represent portions of spectrum that is available to the core network system 202, including a spectrum portion 600, a spectrum portion 602, and a spectrum portion 604 in the illustrated embodiment.

Figure 6B:
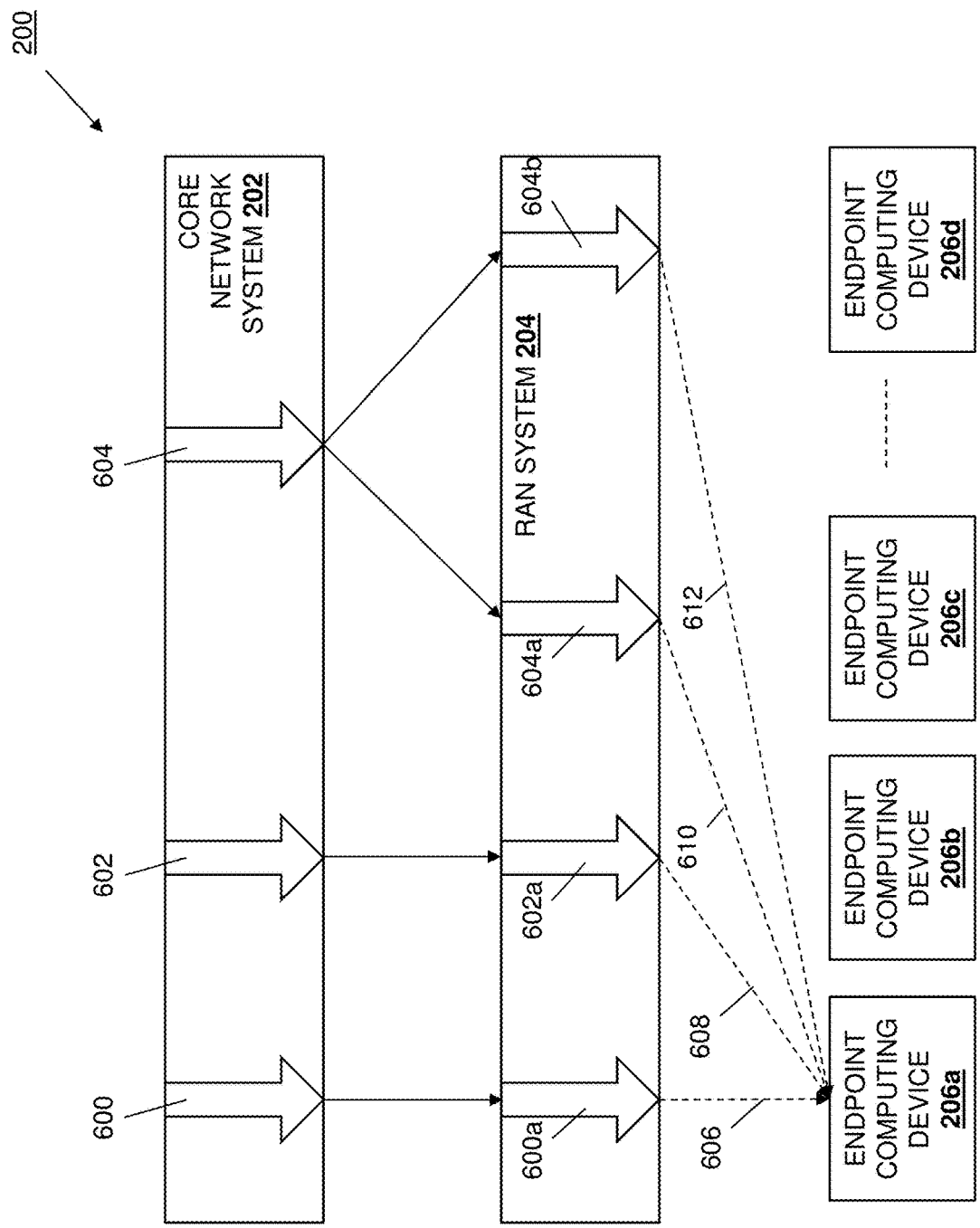
FIG. 6B is a schematic view illustrating an embodiment of the endpoint computing device multi-network slice utilization system of FIG. 2 operating during the method of FIG. 4.

Furthermore, the allocation of network slices and the making of those network slices available via the RAN system 204 for use in wireless communications by the core network system 202 is illustrated in FIG. 6A by arrows provided in the RAN system 204, and may include the core network system 202 allocating a network slice 600a from the spectrum portion 600 (as illustrated by the arrow between the spectrum portion 600 and the network slice 600a), allocating a network slice 602a from the spectrum portion 602 (as illustrated by the arrow between the spectrum portion 602 and the network slice 602a), and allocating network slices 604a and 604b from the spectrum portion 604 (as illustrated by the respective arrow between the spectrum portion 604 and the network slices 604a and 604b). One of skill in the art in possession of the present disclosure would recognize that the allocation of network slices by a core network system, and the making of those network slices available by the core network system via a RAN system, may include a variety of conventional operations, and thus is not described herein in detail. Furthermore, one of skill in the art in possession of the present disclosure will appreciate that each network slice 600a, 602a, 604a, and 604b may provide particular networking characteristics including particular data transmission latency, particular data transmission throughput/bandwidth, particular data transmission reliability, other particular QoS networking characteristics, and/or other particular networking characteristics that would be apparent to one of skill in the art in possession of the present disclosure In some embodiments, each network slice allocated by the core system network system 202 and made available via the RAN system 204 by the core network system 202 may be configured to identify the particular networking characteristics provided by that network slice. For example, each of the network slices 500a, 502a, 504a, and 504b may be configured to advertise its networking characteristics such that the network slice engine 304 in the endpoint computing device 206a/300 may identify the networking characteristics of each network slice that is available for connection to the endpoint computing device 206a/300. FIG. 6B illustrates how the network slice 600a may advertise its networking characteristics 606 to the endpoint computing device 206a (illustrated via a dashed arrow in FIG. 6B), the network slice 602a may advertise its networking characteristics 608 to the endpoint computing device 206a (illustrated via a dashed arrow in FIG. 6B), the network slice 604a may advertise its networking characteristics 610 to the endpoint computing device 206a (illustrated via a dashed arrow in FIG. 6B), and the network slice 604b may advertise its networking characteristics 610 to the endpoint computing device 206a (illustrated via a dashed arrow in FIG. 6B). One of skill in the art in possession of the present disclosure will appreciate that the dashed arrows in FIG. 6B may indicate the retrieval of the networking characteristics 606, 608, 610, and 612 by the network slice engine 304 in the endpoint computing device 206a/300 via the network slice advertisements discussed above. In a specific example, any particular network slice may identify its networking characteristics via a network slice identifier, a network slice name, a network slice data traffic QoS (e.g., default/best effort, video streaming best effort, enterprise high priority, etc.), and/or a code (e.g., 0x00, 0x1A, 0X12, etc.).

As such, at block 406, the network slice engine 304 in the endpoint computing device 206a/300 may identify the latency networking characteristics, the throughput/bandwidth networking characteristics, the reliability networking characteristics, other QoS networking characteristics, and/or any other networking characteristics provided by each of the network slices 600a, 602a, 604a, and 604b. Furthermore, while a particular technique for identifying networking characteristics of a network slice have been described, one of skill in the art in possession of the present disclosure will appreciate that other techniques for identifying networking characteristics of a network slice may fall within the scope of the present disclosure as well. In a specific example, a RAN controller in the RAN system 204 may inform the endpoint computing device about the number of network slices available to that endpoint computing device from the RAN system, and the QoS networking characteristics associated with each network slice, which allows the endpoint computing device to associate the data traffic provided by each application or workload operating on that endpoint computing device with a network slice that satisfies its network connectivity requirements, as discussed below.

Thus, at block 406, the network slice engine 304 in the endpoint computing device 206a/300 may identify a respective one of the network slices 206a-206d that includes networking characteristics that satisfy the networking connectivity requirements of each of the applications detected at block 402. Continuing with the example provided above, at block 406 the network slice engine 304 in the endpoint computing device 206a/300 may identify a network slice that includes networking characteristics that satisfy the networking connectivity requirements for a video communication application detected at block 402 that includes a relatively high bandwidth networking connectivity requirement, a relatively low latency networking connectivity requirement, and a relatively high reliability networking connectivity requirement. Similarly, at block 406 the network slice engine 304 in the endpoint computing device 206a/300 may identify a network slice that includes networking characteristics that satisfy networking connectivity requirements for an audio communication application detected at block 402 that includes a relatively low bandwidth networking connectivity requirement, a relatively low latency networking connectivity requirement, and a relatively high reliability networking connectivity requirements. Similarly, at block 406 the network slice engine 304 in the endpoint computing device 206a/300 may identify a network slice that includes networking characteristics that satisfy determine networking connectivity requirements for a video streaming application detected at block 402 that includes a relatively high bandwidth networking connectivity requirement, a relatively intermediate latency networking connectivity requirement, and a relatively intermediate reliability networking connectivity requirement.

Similarly, at block 406 the network slice engine 304 in the endpoint computing device 206a/300 may identify a network slice that includes networking characteristics that satisfy networking connectivity requirements for an office productivity application detected at block 402 that includes a relatively intermediate bandwidth networking connectivity requirement, a relatively low latency networking connectivity requirement, and a relatively low reliability networking connectivity requirements. Similarly, at block 406 the network slice engine 304 in the endpoint computing device 206a/300 may identify a network slice that includes networking characteristics that satisfy networking connectivity requirements for a gaming application detected at block 402 that includes a relatively very high bandwidth networking connectivity requirement, a relatively very high latency networking connectivity requirement, and a relatively very high reliability networking connectivity requirement.

Furthermore, in some embodiments, at block 406 the network slice engine 304 in the endpoint computing device 206a/300 may identify respective network slices that include respective networking characteristics that satisfy different networking connectivity requirements for respective multiple application subsystems, workload subsystems, and/or functionality subsystems included in an application, workload, or functionality (e.g., a first network slice including first networking characteristics that satisfy a first networking connectivity requirement for a first application subsystem included in an application operating on the endpoint computing device 206a/300, a second network slice including second networking characteristics that satisfy a second networking connectivity requirement for a second application subsystem included in that application operating on the endpoint computing device 206a/300, and so on). Further still, in some embodiments, at block 406 the network slice engine 304 in the endpoint computing device 206a/300 may identify a network slice that includes networking characteristics that satisfy the same networking connectivity requirement (or a networking connectivity requirement range) for multiple applications that have been grouped in an application container as discussed above.

As will be appreciated by one of skill in the art in possession of the present disclosure, the identification of respective network slices that include networking characteristics that satisfy the networking connectivity requirements of each application operating on the endpoint computing device 206a/300 may include, for each application with a particular networking connectivity requirement, the identification of a network slice that includes networking characteristics that are closest to those networking connectivity requirements, that fall within some range of those networking connectivity requirements, and/or that one of skill in the art in possession of the present disclosure would recognize make that network slice the most desirable of the network slices that are available to the endpoint computing device 206a/300 for providing that connection for that application. Furthermore, one of skill in the art in possession of the present disclosure will appreciate that situations may arise in which no network slices are available that include networking characteristics that satisfy the network connectivity requirements of an application and, in such situations, the network slice that includes networking characteristics that most closely satisfy the network connectivity requirements of that application may be identified for providing the connection for that application.

In some embodiments, the network slice engine 304 in the endpoint computing device 206a/300 may be configured to request network slices with particular networking characteristics that satisfy the networking connectivity requirements of applications detected to block 402. For example, after determining the networking connectivity requirements for an application at block 404, the network slice engine 304 in the endpoint computing device 206a/300 may transmit a network slice request communication via the RAN system 204 to the core network system 202 (e.g., via an available connection to the core network system 202 that may have been previously established using conventional techniques and/or the techniques described herein), with that network slice request communication providing a request to allocate a network slice having networking characteristics that satisfy the network connectivity requirements of the application, and make that network slice available via the RAN system 204. As such, the core network system 202 may receive that network slice request and, in response, may allocate a network slice having the requested network connectivity requirements, and make that network slice available via the RAN system 204 so that the network slice engine 304 in the endpoint computing device 206a/300 may identify that network slice at block 406.

The method 400 then proceeds to block 408 where the endpoint computing device establishes connections for the detected applications with the respective network slices identified for those applications. In an embodiment, at block 408, the network slice engine 304 in the endpoint computing device 206a/300 may operate to establish a respective connection for each application operating on the endpoint computing device 206a/300 with the network slice that was identified at block 406 as including networking characteristics that satisfy the networking connectivity requirements of that application. For example, at block 408, the network slice engine 304 in the endpoint computing device 206a/300 may, for each application for which it identified a network slice at block 406, present that application as a virtual endpoint computing device in network slice connection communications exchanged with the RAN system 204, with the network slice communications operating to establish a connection between that application and the network slice that was identified for that application at block 406. As will be appreciated by one of skill in the art in possession of the present disclosure, the network slice communications and/or establishment of the connection between the network slice and the application that is presented as a virtual endpoint computing device may be similar to conventional network slice/physical endpoint device communications and/or connection establishment, with the exception of the application being presented as a virtual endpoint computing device in the network slice connection communications and/or connection establishment, and thus are not described herein in detail.

Figure 6C:
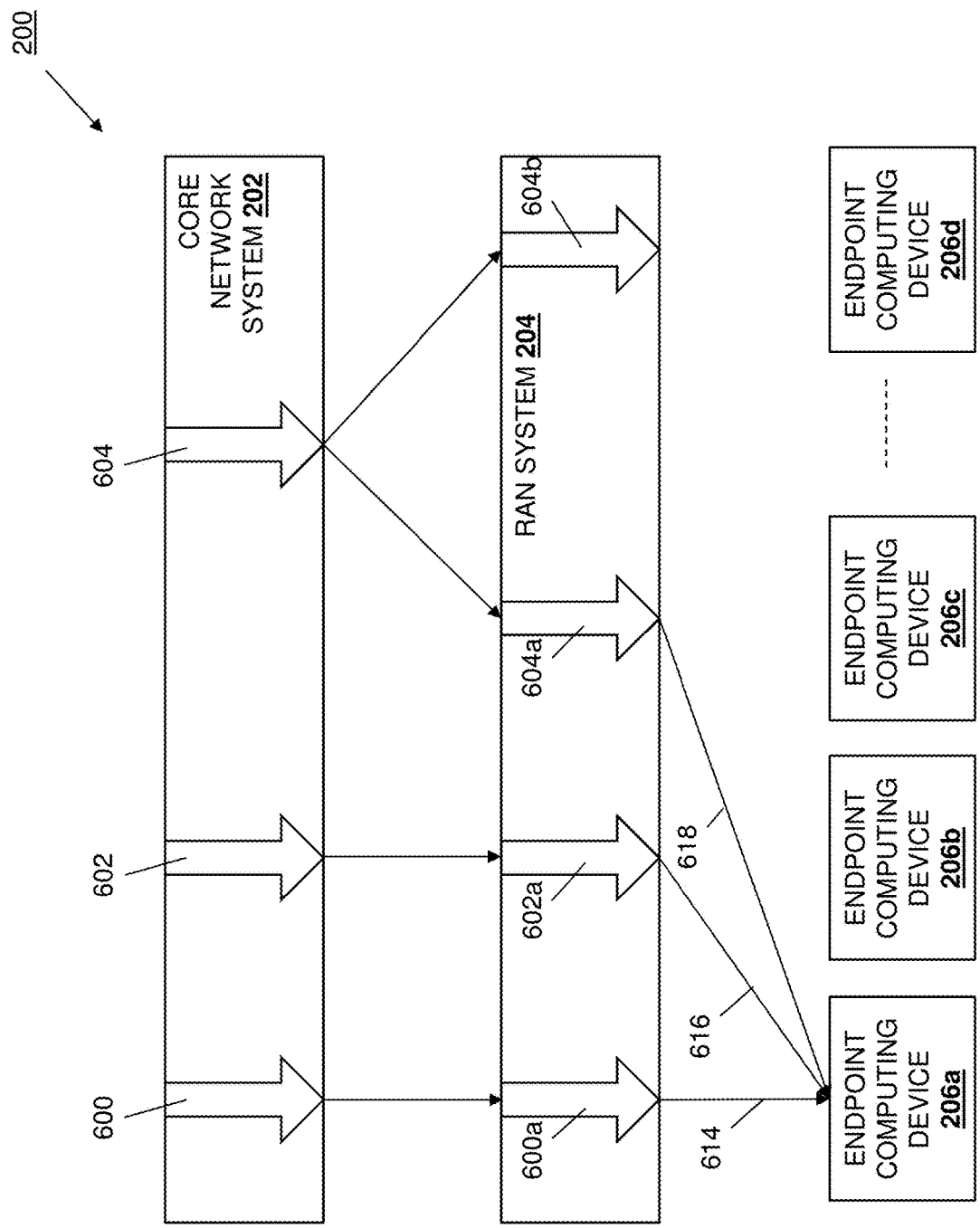
FIG. 6C is a schematic view illustrating an embodiment of the endpoint computing device multi-network slice utilization system of FIG. 2 operating during the method of FIG. 4.

As such, with reference to FIG. 6C, at block 408, the network slice engine 304 in the endpoint computing device 206a/300 may establish a connection 614 for a first application operating on the endpoint computing device 206a with the network slice 600a that was identified as having networking characteristics that satisfy the networking connectivity requirements determined for the first application, establish a connection 616 for a second application operating on the endpoint computing device 206a with the network slice 602a that was identified as having networking characteristics that satisfy the networking connectivity requirements determined for the second application, and establish a connection 618 for a third application operating on the endpoint computing device 206a with the network slice 604a that was identified as having networking characteristics that satisfy the networking connectivity requirements determined for the third application. While not illustrated, as discussed above one of skill in the art in possession of the present disclosure will appreciate that connections with multiple network slices for each application operating on any or all of the endpoint computing devices 206b-206c may be established in a similar manner while remaining within the scope of the present disclosure as well.

Furthermore, in some embodiments, at block 408 the network slice engine 304 in the endpoint computing device 206a/300 may establish connections for respective multiple application subsystems, workload subsystems, and/or functionality subsystems included in an application, workload, or functionality with respective network slices that include respective networking characteristics that satisfy their different networking connectivity requirements (e.g., establishing a first connection with a first network slice including first networking characteristics that satisfy a first networking connectivity requirement for a first application subsystem included in an application operating on the endpoint computing device 206a/300, establishing a second connection with a second network slice including second networking characteristics that satisfy a second networking connectivity requirement for a second application subsystem included in that application operating on the endpoint computing device 206a/300, and so on). Further still, in some embodiments, at block 408 the network slice engine 304 in the endpoint computing device 206a/300 may establish a connection with a network slice that includes networking characteristics that satisfy the same networking connectivity requirement (or a networking connectivity requirement range) for multiple applications that have been grouped in an application container. As such, one of skill in the art in possession of the present disclosure will appreciate that any single endpoint computing device may appear to the RAN system 204 and/or the core network system 202 as many (e.g., tens, hundreds, or more) endpoint computing devices due to the many applications operating on that single endpoint computing device being presented as respective virtual endpoint computing devices.

The method 400 then proceeds to block 410 where the endpoint computing device exchanges communications for the detected applications using the identified network slices. In an embodiment, at block 410, communications may be exchanged between for each application using the connection established with its respective network slice that satisfies its respective networking connectivity requirements. As such, with reference to FIG. 6C, at block 410, the network slice engine 304 in the endpoint computing device 206a/300 may utilize its communication system 308 to exchange communications via the connection 614 with the network slice 600a for the first application operating on the endpoint computing device 206a (e.g., with a device coupled to the RAN system 204, a device coupled to the core network system 202 via a network, etc.), may utilize its communication system 308 to exchange communications via the connection 616 with the network slice 602a for the second application operating on the endpoint computing device 206a (e.g., with a device coupled to the RAN system 204, a device coupled to the core network system 202 via a network, etc.), and may utilize its communication system 308 to exchange communications via the connection 618 with the network slice 602a for the third application operating on the endpoint computing device 206a (e.g., with a device coupled to the RAN system 204, a device coupled to the core network system 202 via a network, etc.) As will be appreciated by one of skill in the art in possession of the present disclosure, the exchange of communications via a connection with a network slice at block 410 may be similar to conventional network slice communication exchanges, with the exception of that multiple applications operating on the endpoint computing device 206a/300 may be exchanging communications via their respective connections with their respective network slices that each include respective networking characteristics that satisfy the networking connectivity requirements of those applications. As discussed below, each of the network slices provided by the core network system 202 are isolated from each other and, as such, any application or workload that is operating on an endpoint computing device and that is utilizing a particular network slice will be unaware of the other networks available via the other network slices being utilized by other applications or workloads operating on that same endpoint computing device.

Furthermore, in some embodiments, at block 408 the network slice engine 304 in the endpoint computing device 206a/300 may operate to exchange communications for respective multiple application subsystems, workload subsystems, and/or functionality subsystems included in an application, workload, or functionality via connections provided with respective network slices (e.g., exchanging communications via a first connection with a first network slice for a first application subsystem included in an application operating on the endpoint computing device 206a/300, exchanging communications via a second connection with a second network slice for a second application subsystem included in that application operating on the endpoint computing device 206a/300, and so on). Further still, in some embodiments, at block 408 the network slice engine 304 in the endpoint computing device 206a/300 may exchange communications via a connection with a network slice for multiple applications that have been grouped in an application container as discussed above.

The method 400 then proceeds to decision block 412 where it is determined whether a detected application is unavailable. In an embodiment, at decision block 412, the network slice engine 304 in the endpoint computing device 206a/300 may operate to determine whether an application for which a respective connection was established with a respective network slice has become unavailable. For example, an application, workload, or other functionality operating on the endpoint computing device may complete, be shut down, and/or may otherwise become unavailable in a manner that does not utilize the network slice with which that application, workload, or other functionality was connected at block 410. As such, the network slice engine 304 in the endpoint computing device 206a/300 may operate to continuously or periodically to monitor applications (or application subsystems in an application, or applications grouped in an application container) for which a connection with a network slice was provided at block 408 to determine whether that application (or application subsystem) has become unavailable or is otherwise not utilizing the network slice to which it was connected. However, while a specific technique for monitoring for the use of a network slice has been described, one of skill in the art in possession of the present disclosure will appreciate that network slice utilization may be determined in a variety of other manners that will fall within the scope of the present disclosure as well.

If, at decision block 412, it is determined that no detected applications are unavailable, the method 400 returns to block 410. As such, in response to determining that each application (or application subsystem in an application, or application grouped in an application container) for which a connection with a network slice was established at block 408 is still utilizing that network slice, the method 400 may loop to continue to exchange communications for applications using the connections to their network slices at block 410, and monitor whether any of those applications have become unavailable at decision block 412. If at decision block 406, it is determined that a detected application is not available, the method 400 proceeds to block 414 where the endpoint computing device ends the connection with the identified network slice for the unavailable detected application. In an embodiment, at block 414 and in response to determining that an application (or application subsystem in an application, or all applications grouped in an application container) is no longer utilizing a connection to a network slice that was provided at block 408, the network slice engine 304 in the endpoint computing device 206a/300 may end that connection with the network slice for that application (or application subsystem in an application, or application container), and release that network slice for use by other applications and/or endpoint computing devices. As will be appreciated by one of skill in the art in possession of the present disclosure, the ending of a connection with a network slice at block 414 may be similar to conventional connection ending operations, and thus is not described herein in detail. The method 400 may then loop to continue to exchange communications for available applications using the connections to their network slices at block 410, monitor whether any of those applications have become unavailable at decision block 412, and end connections to network slices that are no longer being utilized.

In some embodiments, repeated performance of the method 400 may allow the network slice engine 304 in the endpoint computing devices 300 to perform intelligent network slice operations based on learned behavior of the endpoint computing device 300 and/or the applications provided thereon. For example, the network slice engine 304 in the endpoint computing device 300 may monitor the use of applications on the endpoint computing device 300, the time of such application use on the endpoint computing device 300, locations of the endpoint computing device 300, and/or any other information that would be apparent to one of skill in the art in possession of the present disclosure, and may subsequently utilize that information to reserve network slices that include networking characteristics that satisfy the networking connectivity requirements of particular applications. As such, when an endpoint computing device repeatedly operates a particular application at a particular time and in a particular location that utilizes a particular network slice that includes networking characteristics that satisfy its networking connectivity requirements, the network slice engine 304 in the endpoint computing device 300 may learn that behavior and subsequently operate to reserve that network slice at the learned reoccurring application use time for use by the learned application in the learned location. However, while a specific intelligent network slice operation is described, one of skill in the art in possession of the present disclosure will recognize that other intelligent network slice operations may be performed that will fall within the scope of the present disclosure as well.

Thus, systems and methods have been described that provide for the utilization of respective network slices for different functionality (e.g., different applications, different workloads, etc.) provided on any particular endpoint computing device. For example, a 5G core network system that is coupled to a 5G RAN system may allocate a plurality of a network slices and make each of the plurality of network slices available for use in wireless communications via the 5G RAN system. An endpoint computing device may include first and second applications that are configured to operate on the endpoint computing device, and the endpoint computing device may detect each of the first application and the second application, determine a first networking connectivity requirement for the first application, and determine a second networking connectivity requirement for the second application. The endpoint computing device may then identify a first network slice that is allocated by the 5G core network system, available via the 5G RAN system, and that includes networking characteristics that satisfy the first networking connectivity requirements for the first application. The endpoint computing device may also identify a second network slice that is allocated by the 5G core network system, available via the 5G RAN system, and that includes networking characteristics that satisfy the second networking connectivity requirements for the second application. The endpoint computing device then establishes a first connection for the first application with the first network slice, and establishes a second connection for the second application with the second network slice. Subsequently, the first application may exchange first communications via the 5G RAN system and the 5G core network system using the first network slice, and the second application may exchange second communications via the 5G RAN system and the 5G core network system using the second network slice. As such, network slicing is extended to general purpose endpoint computing devices running applications (or workloads) with different networking connectivity requirements by connecting each of those applications (or workloads) to a respective network slice with networking characteristics that satisfy its networking connectivity requirements, thus optimizing the networking connectivity of the general purpose endpoint computing device on a per-application/per-workload/per functionality basis.

Figure 7A:
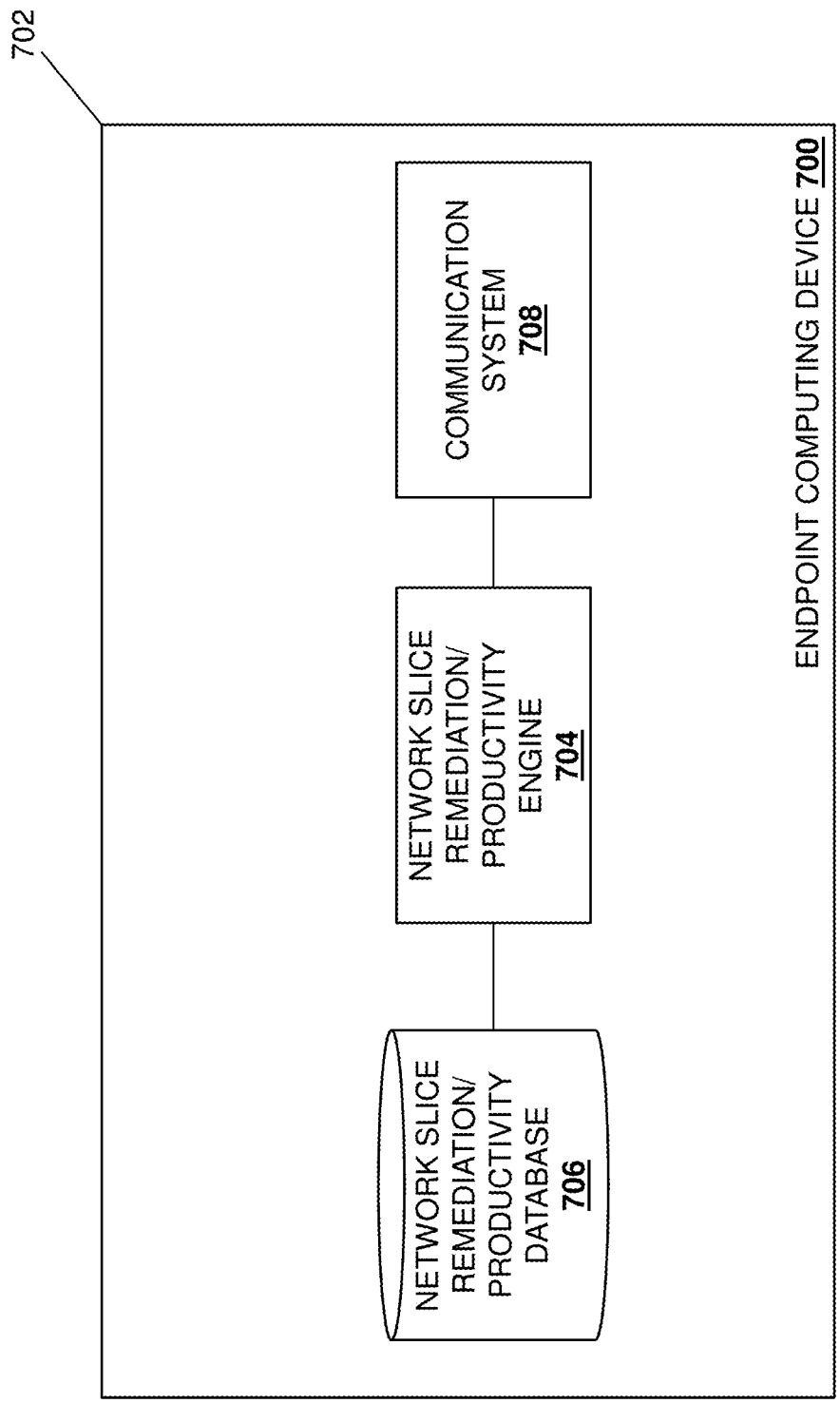
FIG. 7A is a schematic view illustrating an embodiment of an endpoint computing device that may provide the endpoint computing device multi-network slice remediation/productivity system of the present disclosure.
Figure 7B:
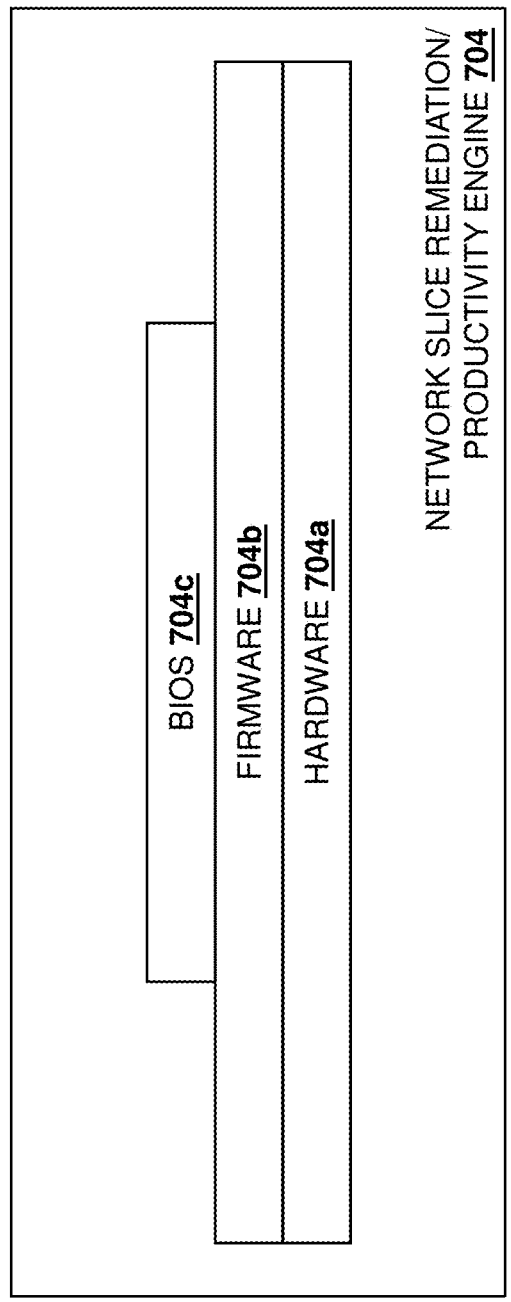
FIG. 7B is a schematic view illustrating an embodiment of a network slice remediation/productivity engine that may be provided in the endpoint computing device of FIG. 7A.

Referring now to FIGS. 7A and 7B, an embodiment of an endpoint computing device 700 is illustrated that may provide the endpoint computing device multi-network slice remediation/productivity system of the present disclosure, and in some embodiments may provide any or all of the endpoint computing devices 206a-206d discussed above with reference to FIG. 2. As such, the endpoint computing device 300 may be provided by the IHS 100 discussed above with reference to FIG. 1 and/or may include some or all of the components of the IHS 100, and in specific examples may be provided by server computing devices, networking computing devices, storage systems, desktop computing devices, laptop/notebook computing devices, tablet computing devices, mobile phones, and/or other computing devices known in the art. Furthermore, while illustrated and discussed as a endpoint computing device, one of skill in the art in possession of the present disclosure will recognize that the functionality of the endpoint computing device 700 discussed below may be provided by other devices that are configured to operate similarly as discussed below. In the illustrated embodiment, the endpoint computing device 700 includes a chassis 702 that houses the components of the endpoint computing device 700, only some of which are illustrated below. For example, the chassis 702 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network slice remediation/productivity engine 704 that is configured to perform the functionality of the network slice remediation/productivity engines and/or endpoint computing devices discussed below. Furthermore, in some embodiments, some or all of the functionality of the endpoint computing device 300 of FIG. 3 and the endpoint computing device 700 may be combined or otherwise provided in the same endpoint computing device such that a single endpoint computing device is configured to perform any of the functionality described herein for the network slice remediation/productivity engine 704 and the network slice engine 304.

As illustrated in FIG. 7B, in some embodiments, the network slice remediation/productivity engine 704 may be provided by hardware 704a, firmware 704b, and/or in many examples, a Basic Input/Output System (BIOS) 704c that may be included as part of, or provided by, the firmware 704b and which one of skill in the art in possession of the present disclosure will appreciate is utilized to perform initialization of the hardware 704a when the endpoint computing device 700 is operating in a pre-boot environment (as well as provide runtime services for operating systems and/or other programs when the endpoint computing device 700 is operating in a runtime environment.) In a specific example, the BIOS 704c may include a BIOS processing system and a BIOS memory system (e.g., as part of the hardware 704a and/or firmware 704b that provide the BIOS 704c) that includes instructions that, when executed by the BIOS processing system, cause the BIOS processing system to provide the network slice remediation/productivity engine 704. However, while the functionality of the network slice remediation/productivity engine 704 is described below as being provided by the BIOS 704c, that functionality may also be provided by other firmware subsystems or modules while remaining within the scope of the present disclosure as well. Furthermore, while described as a "BIOS", one of skill in the art in possession of the present disclosure will appreciate that the BIOS 704c may be replaced and/or otherwise provided by a Universally Extensible Firmware Interface (UEFI) system, and/or other initialization systems while remaining within the scope of the present disclosure as well.

Returning to FIG. 7A, the chassis 702 may also house a storage system (not illustrated, but which may include the storage 108 discussed above with reference to FIG. 1) that is coupled to the network slice remediation/productivity engine 704 (e.g., via a coupling between the storage system and the processing system) and that includes a network slice remediation/productivity database 706 that is configured to store any of the information utilized by the network slice remediation/productivity engine 704 discussed below. The chassis 702 may also house a communication system 708 that is coupled to the network slice remediation/productivity engine 704 (e.g., via a coupling between the communication system 708 and the processing system) and that may be provided by a Network Interface Controller (NIC), wireless communication systems (e.g., 5G cellular wireless components, BLUETOOTH®, Near Field Communication (NFC) components, WiFi components, etc.), and/or any other communication components that would be apparent to one of skill in the art in possession of the present disclosure. While a specific endpoint computing device 700 has been illustrated, one of skill in the art in possession of the present disclosure will recognize that endpoint computing devices (or other devices operating according to the teachings of the present disclosure in a manner similar to that described below for the endpoint computing device 700) may include a variety of components and/or component configurations for providing conventional endpoint computing device functionality, as well as the functionality discussed below, while remaining within the scope of the present disclosure as well.

Figure 8:
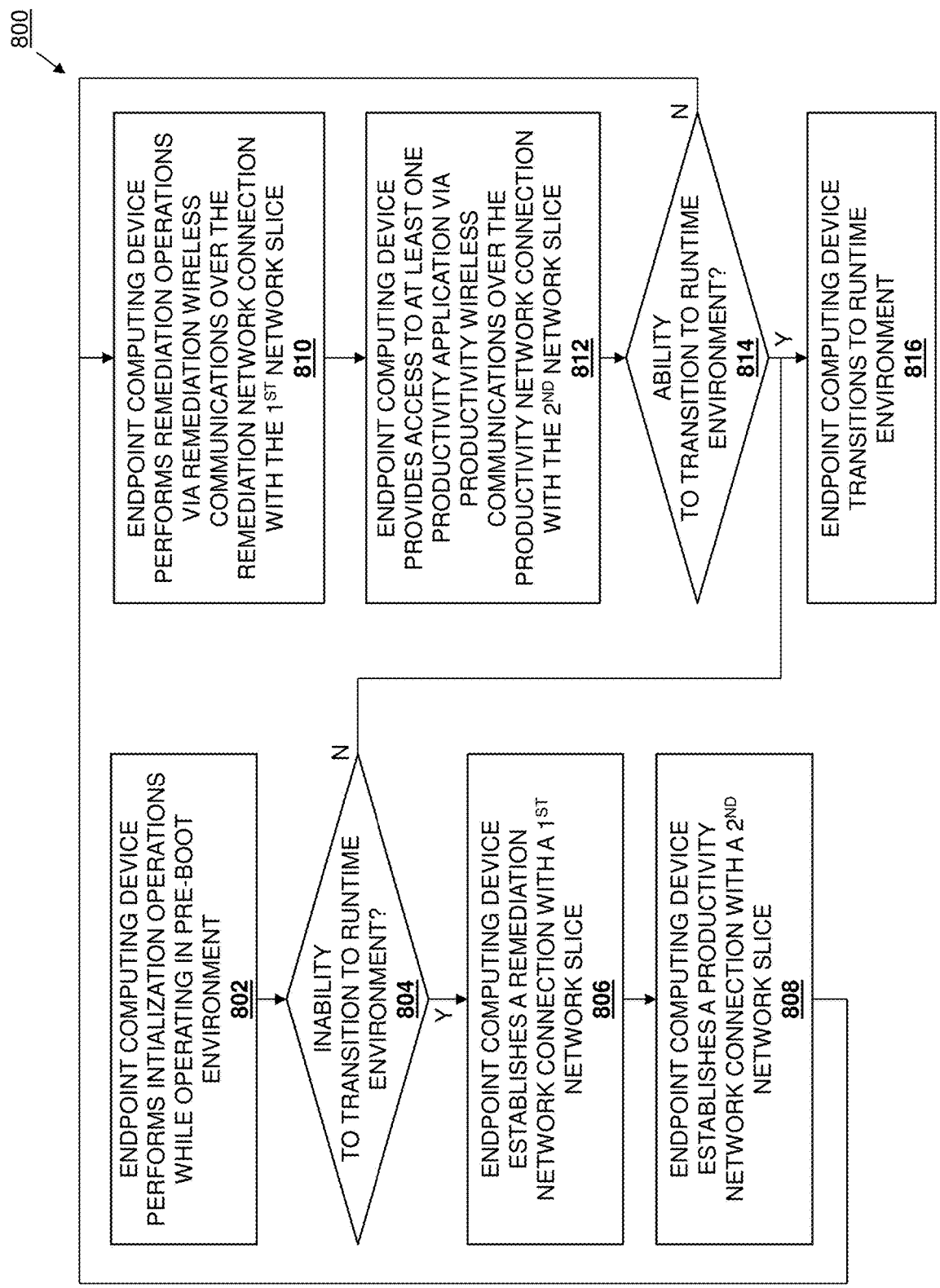
FIG. 8 is a flow chart illustrating an embodiment of a method for providing for productivity with an endpoint computing device while remediating issues with that endpoint computing device.

Referring now to FIG. 8, an embodiment of a method 800 for providing for productivity with an endpoint computing device while remediating issues with that endpoint computing device is illustrated. As discussed below, the systems and methods of the present disclosure utilize some of the techniques described above as being performed by the endpoint computing device multi-network slice utilization system 200 in order to perform remediation operations while allowing productivity operations at the same time on the same endpoint computing device via separate network slices. For example, a core network system coupled to a RAN system is configured to allocate a plurality of a network slices and make each of the plurality of network slices available for use in wireless communications via the RAN system, and when an endpoint computing device determines that it is unable to transition from operating in a pre-boot environment to operating in a runtime environment, it establishes a remediation network connection with a first network slice included in the plurality of network slices, and establishes a productivity network connection with a second network slice included in the plurality of network slices. The endpoint computing device then performs remediation operations via remediation wireless communications over the remediation network connection with the first network slice, and provide access to at least one productivity application that is configured to allow a user to perform productivity operations via productivity wireless communications over the productivity network connection with the second network slice while performing the remediation operations. As such, endpoint computing devices that get "stuck" in a pre-boot environment may have their issues remediated while also allowing users of those endpoint computing devices to perform productivity operations until the remediation operations are complete.

The method 800 begins at block 802 where an endpoint computing device performs initialization operations while operating in a pre-boot environment. In an embodiment, at or prior to block 802, the endpoint computing device 700 may be powered on, reset, booted, and/or otherwise initialized such that the endpoint computing device 700 enters a pre-boot environment. As will be understood by one of skill in the art in possession of the present disclosure, computing devices such as server computing devices, networking computing devices, storage systems, desktop computing devices, laptop/notebook computing devices, tablet computing devices, and mobile phones discussed above, may perform a variety of initialization operations (e.g., boot operations) in order to initialize that computing device so that it may enter a runtime environment by, for example, providing an operating system for use on the computing device by a user. Furthermore, as discussed above, the BIOS 704c may be provided by one or more firmware modules that perform hardware initialization during the initialization process (e.g., a boot process, a power-on startup process, etc.), and thus may operate to perform a variety of conventional initialization operations in some examples of block 802 (e.g., by providing the first software module that is run on the endpoint computing device 700 following power-on, reset, or boot, initializing and testing the hardware 704a in the endpoint computing device 700, and/or performing any of a variety of BIOS initialization operations that would be apparent to one of skill in the art in possession of the present disclosure.) However, while a few examples have been provided, one of skill in the art in possession of the present disclosure will appreciate that endpoint computing devices may perform initialization operations while operating in a pre-boot environment in a variety of manners that will fall within the scope of the present disclosure as well.

The method 800 then proceeds to decision block 804 where it is determined whether the endpoint computing device is unable to transition to a runtime environment. In an embodiment, at decision block 804, the network slice remediation/productivity engine 704 in the endpoint computing device 700 may operate to monitor the initialization operations that are being performed while the endpoint computing device 700 is operating in the pre-boot environment to determine whether the endpoint computing device 700 is unable to transition to a runtime environment. For example, the BIOS 704c may be configured to monitor the initialization operations it is performing (as discussed above) in order to determine whether the endpoint computing device 700 is unable to transition to a runtime environment. In some specific examples, a determine of whether an endpoint computing device is unable to transition to a runtime environment may include a determination of whether an operating system that is configured to provide (at least in part) the runtime environment for the endpoint computing device has failed to boot or otherwise initialize (e.g., due to corruption with the operating system), that any of a variety of security issues (e.g., defined by security policies stored in the network slice remediation/productivity database 706) are preventing the endpoint computing device from booting or otherwise initializing, that at least some hardware in the endpoint computing device is corrupted or otherwise unavailable, and/or due to a variety of runtime environment transition failures that would be apparent to one of skill in the art in possession of the present disclosure.

Furthermore, while a few specific example are provided above, one of skill in the art in possession of the present disclosure will appreciate that other compliance issues may prevent server computing devices, networking computing devices, storage systems, desktop computing devices, laptop/notebook computing devices, tablet computing devices, mobile phones, and/or other computing devices from initializing, and those compliance issues may be associated with a failure of the endpoint computing device to comply with network policies provided by a network administrator of a network to which the computing device belongs. As such, in addition to functional issues that may prevent endpoint computing devices from initializing, network compliance issues associated with an otherwise properly functioning endpoint computing device may prevent those endpoint computing devices from transitioning to a runtime environment, and thus may be monitored at decision block 804 as well.

If, at decision block 804, it is determined that the endpoint computing device is unable to transition to a runtime environment, the method 800 proceeds to block 806 where the endpoint computing device establishes a remediation network connection with a first network slice. In an embodiment, at decision block 804, the network slice remediation/productivity engine 704 in the endpoint computing device 700 may determine that the endpoint computing device 700 is unable to transition to a runtime environment, and the method 800 may proceed to block 806. For example, the BIOS 704c may determine the endpoint computing device 700 is unable to transition to a runtime environment due to an operating system that is configured to provide (at least in part) the runtime environment for the endpoint computing device failing to boot or otherwise initialize (e.g., due to corruption with the operating system), due to security issues (e.g., defined by security policies stored in the network slice remediation/productivity database 706) that are preventing the endpoint computing device from booting or otherwise initializing, due to at least some hardware in the endpoint computing device being corrupted or otherwise unavailable, due to compliance issues, and/or due to a variety of runtime environment transition failures that would be apparent to one of skill in the art in possession of the present disclosure. As will be appreciated by one of skill in the art in possession of the present disclosure, in situations where at least some hardware in the endpoint computing device is corrupted or otherwise unavailable, the method 800 may operate as discussed below as long as some minimal amount of hardware is uncorrupted or otherwise available that is capable of allowing the endpoint computing device to perform the functionality described below.

Figure 9A:
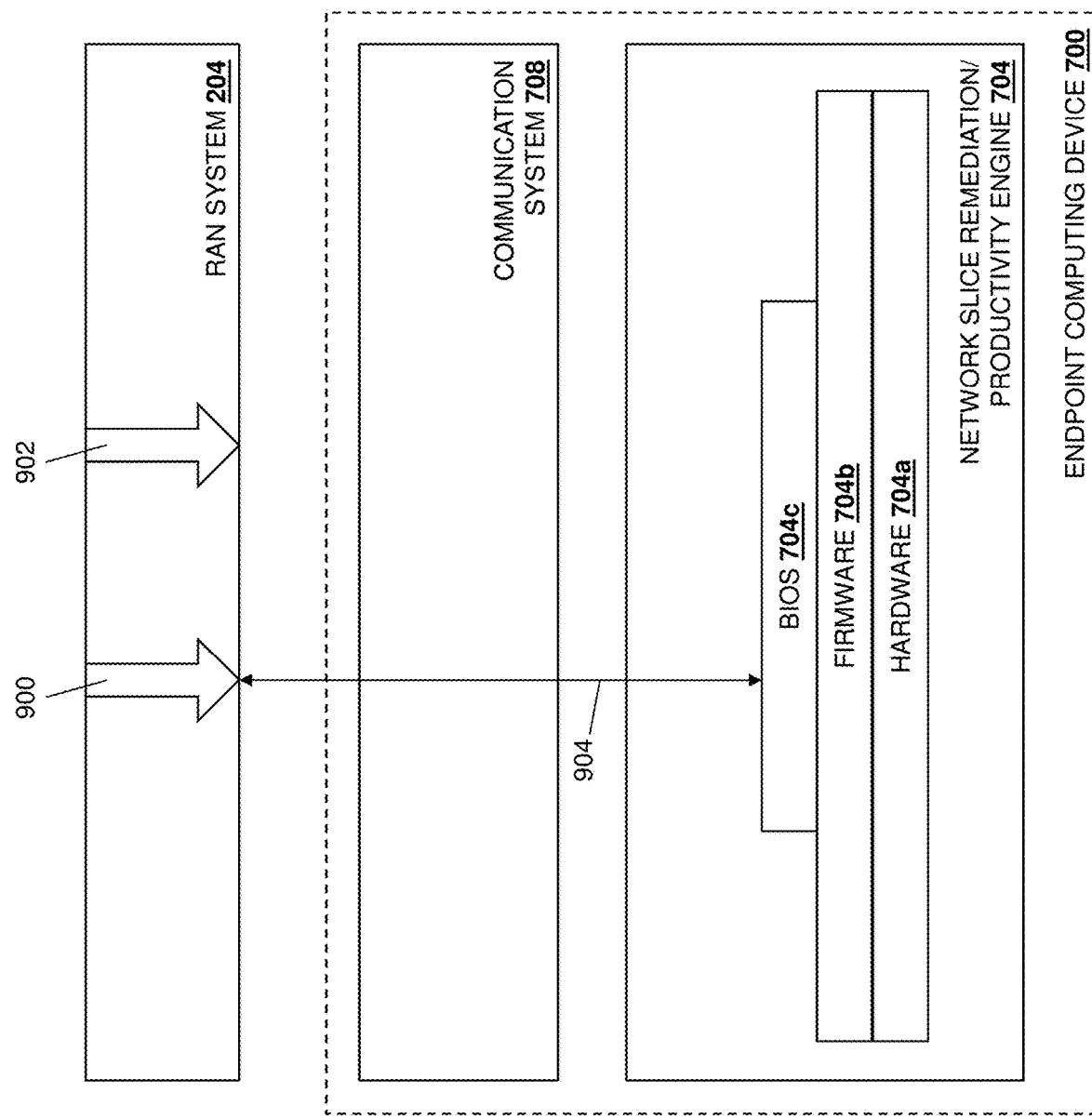
FIG. 9A is a schematic view of the endpoint computing device of FIGS. 7A and 7B operating during the method of FIG. 8.

As such, in an embodiment of block 806, the network slice remediation/productivity engine 704 in the endpoint computing device 700 may operate to establish a remediation network connection with a first network slice. For example, the BIOS 704c may perform some network connection establishment operations that are similar to those described above as being performed by the network slice engine 304 to establish a remediation network connection with a first network slice that was allocated by the core network system 202 and made available via the RAN system 204. Similarly as described above, the core network system 202 (e.g., a 5G core network system) discussed above may operate to allocate network slices and make those network slices available to via the RAN system 204 (e.g., a 5G RAN system) for use in wireless communications. For example, similarly as discussed above with reference to the core network system 202 in FIG. 5, the core network system 202 may allocate portions of spectrum (e.g., a first spectrum portion and a second spectrum portion in the examples below) that are available to the core network system 202. With reference to FIG. 9A, the allocation of network slices and the making of those network slices available by the core network system 202 via the RAN system 204 for use in wireless communications is illustrated by arrows provided in the RAN system 204, and may include the core network system 202 allocating a network slice 900 from the first spectrum portion, and allocating a network slice 902 from the second spectrum portion. As discussed above, one of skill in the art in possession of the present disclosure would recognize that the allocation of network slices by a core network system, and the making of those network slices available by the core network system via a RAN system, may include a variety of conventional operations, and thus is not described herein in detail.

As such, in an embodiment of block 806, the network slice remediation/productivity engine 704 provided by the BIOS 704c in the endpoint computing device 206a/300 may perform some network connection establishment operations that are similar to those described above as being performed by the network slice engine 304 to establish the remediation network connection 904 with the network slice 900. As will be appreciated by one of skill in the art in possession of the present disclosure, in some embodiments, the identification of the network slice 900 based on networking connectivity requirements for remediation operations and networking characteristics of the network slice 900 (i.e., similarly as discussed above for the identification of networking connectivity requirement for an application and networking characteristics for a network slice) need not necessarily be performed during the method 800, and thus at block 806 the network slice 900 may simply be identified as an available network slice for the remediation network connection 904 prior to establishing the remediation network connection 904 with the network slice 900. However, the performance of network slice identification based on networking connectivity requirements for remediation operations and networking characteristics of the network slice 900 will fall within the scope of the present disclosure as well.

Thus, at block 806, the network slice remediation/productivity engine 704 provided by the BIOS 704c in the endpoint computing device 206a/300 may identify itself, a BIOS subsystem (e.g., a networking module in the BIOS 704c), and/or some other functionality in the network slice remediation/productivity engine 704 as a virtual endpoint computing device in network slice connection communications exchanged with the RAN system 204, with the network slice communications operating to establish the remediation network connection 904 with the network slice 900. As will be appreciated by one of skill in the art in possession of the present disclosure, the network slice communications and/or establishment of the connection between the network slice 900 and the BIOS 704c, BIOS subsystem, or other BIOS functionality that is presented as a virtual endpoint computing device may be similar to conventional network slice/physical endpoint device communications and/or connection establishment, with the exception of the BIOS 704c, BIOS subsystem, or other BIOS functionality being presented as a virtual endpoint computing device in the network slice connection communications and/or connection establishment, and thus are not described herein in detail.

Figure 9B:
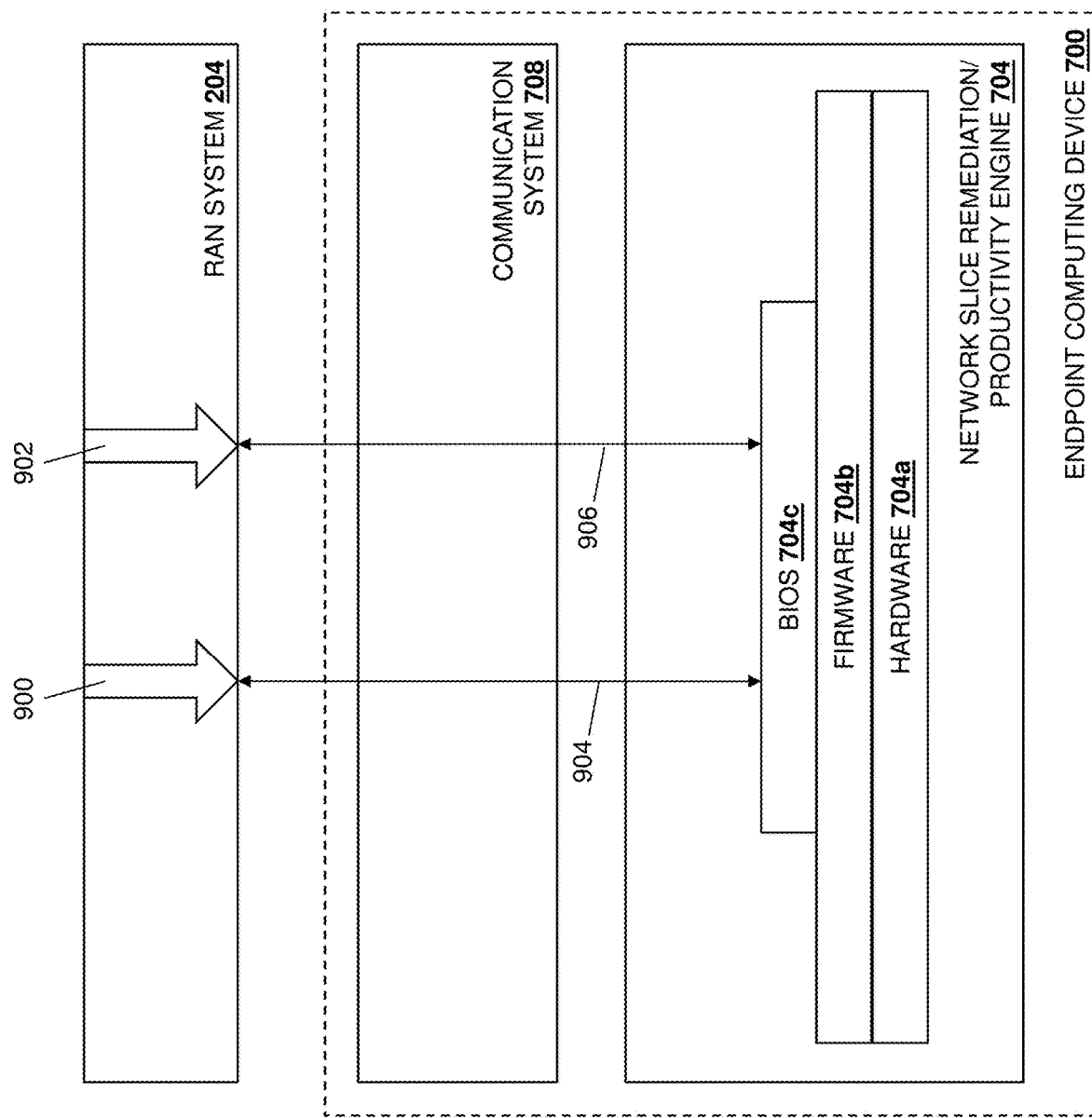
FIG. 9B is a schematic view of the endpoint computing device of FIGS. 7A and 7B operating during the method of FIG. 8.

The method 800 then proceeds to block 808 where the endpoint computing device establishes a productivity network connection with a second network slice. With reference to FIG. 9B, in an embodiment of block 808, the network slice remediation/productivity engine 704 provided by the BIOS 704c in the endpoint computing device 206a/300 may perform some network connection establishment operations that are similar to those described above as being performed by the network slice engine 304 to establish a productivity network connection 906 with the network slice 902. As will be appreciated by one of skill in the art in possession of the present disclosure, in some embodiments, the identification of the network slice 902 based on networking connectivity requirements for productivity operations and networking characteristics of the network slice 902 (i.e., similarly as discussed above for the identification of networking connectivity requirement for an application and networking characteristics for a network slice) need not necessarily be performed during the method 800, and thus at block 808 the network slice 902 may simply be identified as an available network slice for the productivity network connection 906 prior to establishing the productivity network connection 906 with the network slice 902. However, the performance of network slice identification based on the networking connectivity requirements for productivity operations and networking characteristics of the network slice 902 will fall within the scope of the present disclosure as well.

Thus, at block 808, the network slice remediation/productivity engine 704 provided by the BIOS 704c in the endpoint computing device 206a/300 may identify itself, a BIOS subsystem (e.g., a networking module in the BIOS 704c), and/or some other functionality in the network slice remediation/productivity engine 704 as a virtual endpoint computing device in network slice connection communications exchanged with the RAN system 204, with the network slice communications operating to establish the productivity network connection 906 with the network slice 906. As will be appreciated by one of skill in the art in possession of the present disclosure, the network slice communications and/or establishment of the connection between the network slice 902 and the BIOS 704c, BIOS subsystem, or other BIOS functionality that is presented as a virtual endpoint computing device may be similar to conventional network slice/physical endpoint device communications and/or connection establishment, with the exception of the BIOS 704c, BIOS subsystem, or other BIOS functionality being presented as a virtual endpoint computing device in the network slice connection communications and/or connection establishment, and thus are not described herein in detail. Furthermore, as will be appreciated by one of skill in the art in possession of the present disclosure, the remediation network connection 904 and the productivity network connection 906 may be provided as isolated connections via, for example, the isolation of the network slice 900 and the network slice 902, and thus information transmitted over either of the remediation network connection 904 and the productivity network connection 906 may not be accessible via the other connection. For example, data traffic provided on the network slice 900 via the remediation network connection 904 may be routed via a quarantined zone provided by an enterprise that includes tools/software for remediation, with remediation tools provided locally on the endpoint computing device, and the network slice 900 also utilized to upload logs to the enterprise, while data traffic provided on the network slice 902 via the productivity network connection 906 routed via a result enterprise network (i.e., as if the endpoint computing device initialized properly.)

The method 800 then proceeds to block 810 where the endpoint computing device performs remediation operations via remediation wireless communications over the remediation network connection with the first network slice. In an embodiment, at block 810 and following the establishment of the remediation network connection 904, the network slice remediation/productivity engine 704 provided by the BIOS 704c in the endpoint computing device 206a/300 may utilize the remediation network connection 904 to connect to a support service system (not illustrated, but which may be provided by SUPPORT ASSIST®, a service offered by DELL® Inc. of Round Rock, Tex., United States) that is coupled to the core network system 202 via a network, and request assistance from the support service system with any issues associated with the endpoint computing device 700 that are preventing its transition from the pre-boot environment to the runtime environment. In response, the support service system may utilize the remediation network connection 904 to provide a remediation module to the endpoint computing device 700, which may include any software that one of skill in the art in possession of the present disclosure would recognize as being configured to perform the remediation operations discussed below, as well as remediation module components such as, for example, an Internet browser and/or other remediation module components that would be apparent to one of skill in the art in possession of the present disclosure.

As such, the network slice remediation/productivity engine 704 provided by the BIOS 704c in the endpoint computing device 206a/300 may install, provide, and/or otherwise utilize the remediation module at block 810 in order configure the endpoint computing device 700 to perform remediation operations with the support service system, and then begin performing remediation operations for the endpoint computing device 700 at block 810, which may include allowing a technician using the support service system to log into the endpoint computing device 700 (e.g., via the remediation network connection 904), allowing the running of remediation scripts (e.g., PowerShell scripts) on the endpoint computing device 700, retrieving logs from the endpoint computing device 700, updating drivers on the endpoint computing device 700, and/or any other remediation operations that would be apparent to one of skill in the art in possession of the present disclosure. Furthermore, as will be appreciated by one of skill in the art in possession of the present disclosure, the remediation network connection 904 and remediation operations discussed above may provide the endpoint computing device 700 with limited functionality associated primarily with performance of the remediation operations, and thus may prevent a user of the endpoint computing device 700 from performing non-remediation operations, limit network connections by the endpoint computing device 700 (e.g., via the remediation network connection 904 to the support service system), and/or other limited functionality that would be apparent to one of skill in the art in possession of the present disclosure The method 800 then proceeds to block 812 where the endpoint computing device provides access to at least one productivity application via productivity wireless communications over the productivity network connection with the second network slice. In an embodiment, following the establishment of the productivity network connection 906 at block 808, the network slice remediation/productivity engine 704 provided by the BIOS 704c in the endpoint computing device 206a/300 may utilize the productivity network connection 906 at block 812 to connect to a productivity service system (not illustrated) that is coupled to the core network system 202 via a network, and request productivity services from the productivity service system. In response, the productivity service system may utilize the productivity network connection 906 to provide access to productivity services for the endpoint computing device 700, which may include any network accessible services that one of skill in the art in possession of the present disclosure would recognize as being configured to perform the productivity operations discussed below.

Figure 9C:
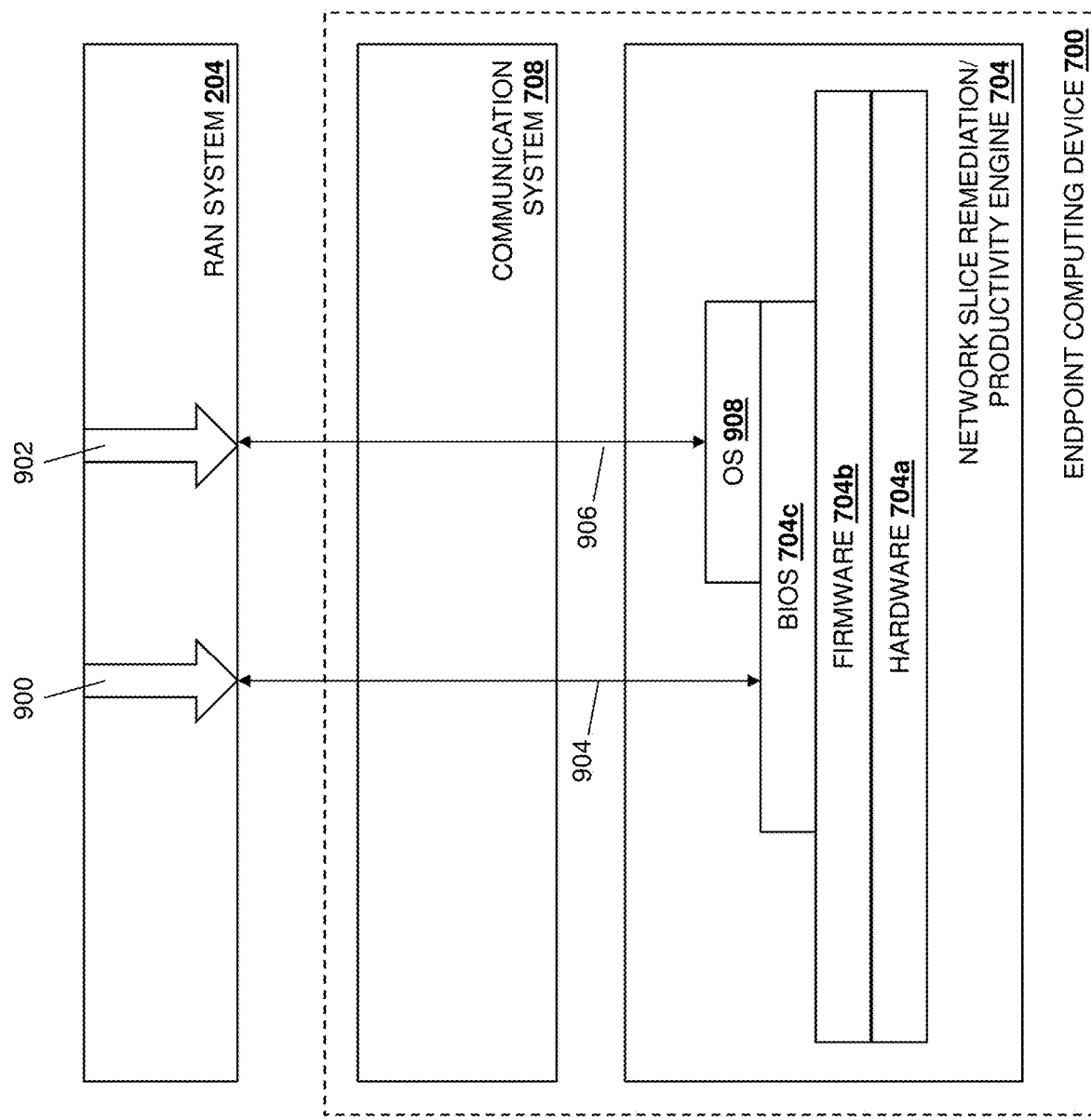
FIG. 9C is a schematic view of the endpoint computing device of FIGS. 7A and 7B operating during the method of FIG. 8.

As such, at block 812, the network slice remediation/productivity engine 704 provided by the BIOS 704c in the endpoint computing device 206a/300 may access one or more network-based productivity applications available via productivity network connection 906, which may include a network accessible operating system (e.g., a LINUX®-based operating system), a network accessible productivity suite applications (e.g., the MICROSOFT OFFICE® productivity suite application), a network accessible Internet browser application (e.g., a lightweight GOOGLE CHROME® Internet browser application), an network accessible file-sharing/storage application, and/or any other network-based productivity applications (e.g., "web applications") that would be apparent to one of skill in the art in possession of the present disclosure. With reference to FIG. 9C, in some embodiments of block 812, the network slice remediation/productivity engine 704 provided by the BIOS 704c in the endpoint computing device 206a/300 may access the productivity service system via the productivity network connection 906, provide login credentials to authenticate to productivity service system, and upon authentication may be provided access to a network accessible operating system 908 that is enabled via the BIOS 704c and that utilizes the productivity network connection 906 to allow use of network accessible productivity suite applications, a network accessible Internet browser application, a file-sharing/storage application that provides access to database(s) including any documents and/or files that may have been previously created, modified, and/or otherwise worked on by a user of the endpoint computing device 700, and/or any other productivity functionality that would be apparent to one of skill in the art in possession of the present disclosure. One of skill in the art in possession of the present disclosure will appreciate that the use of the productivity applications may include the BIOS 704c utilizing clients, modules, and/or other subsystems to enable that use (e.g., the use of a client included on the BIOS 704c to access those productivity applications.) As will be appreciated by one of skill in the art in possession of the present disclosure, the use of the network-based productivity application at block 812 may occur simultaneously with at least some of the remediation operations being performed at block 810.

The method 800 then proceeds to decision block 814 where it is determined whether the endpoint computing device is able to transition to the runtime environment. In an embodiment, at decision block 814, the network slice remediation/productivity engine 704 provided by the BIOS 704c in the endpoint computing device 206a/300 may operate to monitor the remediation operations that are being performed on the endpoint computing device 700 while that endpoint computing device 700 is being utilize to perform the productivity operations in order to determine whether the remediation operations have addressed the issues with the endpoint computing device 700 that prevented the endpoint computing device 700 from transitioning from the pre-boot environment to the runtime environment. For example, the BIOS 704c may be configured to monitor the remediation operations it is performing (as discussed above) in order to determine whether the endpoint computing device 700 is now able to transition to the runtime environment. In some specific examples, a determine of whether an endpoint computing device is now able to transition to the runtime environment may include a determination of that an operating system that is configured to provide (at least in part) the runtime environment for the endpoint computing device will now allow booting or other initialization (e.g., due to corruption with the operating system having been addressed), that any of a variety of security issues (e.g., defined by security policies stored in the network slice remediation/productivity database 706) that were preventing the endpoint computing device from booting or otherwise initializing have been addressed, that compliance issues have been addressed, and/or due to the addressing of any of a variety of runtime environment transition failures that would be apparent to one of skill in the art in possession of the present disclosure. As will be appreciated by one of skill in the art in possession of the present disclosure, hardware issues (i.e., that still allow the method 800 to be performed) may require the dispatching of installation of new hardware on the endpoint computing device 700, and thus the method 800 may be performed over several different power-on events for the endpoint computing device 700 in order to allow a user to utilize the endpoint computing device under the hardware issue is remediated via the replacement of the hardware causing the issues.

If, at decision block 814, it is determined that the endpoint computing device is unable to transition to the runtime environment, the method 800 returns to block 810. As such, the method 800 may loop to perform remediation operations at block 810 while performing productivity operations at block 812 until the endpoint computing device 700 is able to transition to a runtime environment. As will be appreciated by one of skill in the art in possession of the present disclosure, hardware issues (i.e., that still allow the method 800 to be performed) may require the dispatching of installation of new hardware on the endpoint computing device 700, and thus the method 800 may be performed over several different power-on events for the endpoint computing device 700 in order to allow a user to utilize the endpoint computing device under the hardware issue is remediated via the replacement of the hardware causing the issues. If at decision blocks 804 or 814 it is determined that the endpoint computing device is able to transition to the runtime environment, the method 800 proceeds to block 816 where the endpoint computing device transitions to the runtime environment. In an embodiment, at block 816 and in response to determining that the endpoint computing device 700 is now able to transition to a runtime environment, the network slice remediation/productivity engine 704 provided by the BIOS 704c in the endpoint computing device 206a/300 may cause the endpoint computing device 700 to transition to the runtime environment by, for example, resetting, rebooting, and/or otherwise initializing the endpoint computing device 700 so that it may complete initialization operations and enter the runtime environment.

Thus, systems and methods have been described that utilize endpoint computing device multi-network slice utilization techniques in order to perform remediation operations while allowing productivity operations at the same time on the same endpoint computing device via separate network slices. For example, a 5G core network system coupled to a 5G RAN system is configured to allocate a plurality of a network slices and make each of the plurality of network slices available for use in wireless communications via the 5G RAN system, and when an endpoint computing device determines that it is unable to transition from operating in a pre-boot environment to operating in a runtime environment, it establishes a remediation network connection with a first network slice included in the plurality of network slices, and establishes a productivity network connection with a second network slice included in the plurality of network slices. The endpoint computing device then performs remediation operations via remediation wireless communications over the remediation network connection with the first network slice, and provide access to at least one productivity application that is configured to allow a user to perform productivity operations via productivity wireless communications over the productivity network connection with the second network slice while performing the remediation operations. As such, an endpoint computing device that is "stuck" in a pre-boot environment may utilize a first network slice to have its issues remediated, while utilizing a second network slice to also allow a user of that endpoint computing device to perform productivity operations until the remediation operations are complete.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An endpoint computing device multi-network slice remediation/productivity system, comprising:
a Radio Access Network (RAN) system;
a core network system that is coupled to the RAN system and that is configured to allocate a plurality of a network slices and make each of the plurality of network slices available for use in wireless communications via the RAN system; and
an endpoint computing device that is configured, while the endpoint computing device is operating in an endpoint computing device pre-boot environment, to:
determine that the endpoint computing device is unable to transition to operating in an endpoint computing device runtime environment and, in response:
establish a remediation network connection with a first network slice included in the plurality of network slices;
establish a productivity network connection with a second network slice included in the plurality of network slices;
perform, using a remediation module included on the endpoint computing device and via remediation wireless communications over the remediation network connection with the first network slice, remediation operations with a support service system that is logged into the endpoint computing device via the remediation module;
connect to a productivity service subsystem via productivity wireless communications over the productivity network connection with the second network slice;
authenticate with the productivity service subsystem to access a network-based operating system that includes at least one productivity application; and
perform, using the at least one productive application and while performing the remediation operations using the remediation module, productivity operations.

2. The system of claim 1, wherein the determining that the endpoint computing device is unable to transition to operating in the endpoint computing device runtime environment includes determining that the endpoint computing device is unable to initialize an operating system that is available on the endpoint computing device.

3. The system of claim 1, wherein the endpoint computing device is configured to:
receive, from the support service system via the remediation wireless communications, the remediation module; and
install the remediation module on the endpoint computing device.

4. The system of claim 1, wherein the at least one productivity application includes at least one of a productivity suite application, an Internet browser application, and a file-sharing/storage application.

5. The system of claim 1, wherein the first network slice is isolated from the second network slice.

6. The system of claim 1, wherein the endpoint device is configured to:
configure, in response to performing the remediation operations while the endpoint computing device is operating in the endpoint computing device pre-boot environment, the endpoint computing device to transition to operating in the endpoint computing device runtime environment; and
cause the endpoint computing device to transition from operating in the endpoint computing device pre-boot environment to operating in the endpoint computing device runtime environment.

7. An Information Handling System (IHS), comprising:
a processing system; and
a memory system that is coupled to the processing system and that includes instructions that, when executed by the processing system, cause the processing system that is configured, while operating in a pre-boot environment, to:
determine an inability to transition to operating in a runtime environment and, in response:
establish a remediation network connection with a first network slice included in a plurality of network slices that are available via a Radio Access Network (RAN) system;
establish a productivity network connection with a second network slice included in the plurality of network slices that are available via the RAN system;
perform, using a remediation module included on the IHS and via remediation wireless communications over the remediation network connection with the first network slice, remediation operations with a support service system that is logged into the IHS via the remediation module;
connect to a productivity service subsystem via productivity wireless communications over the productivity network connection with the second network slice;
authenticate with the productivity service subsystem to access a network-based operating system that includes at least one productivity application; and perform, using the at least one productivity application and while performing the remediation operations using the remediation module, productivity operations.

8. The IHS of claim 7, wherein the determining the inability to transition to operating in the runtime environment includes determining an inability to initialize a local operating system.

9. The IHS of claim 7, wherein the network slice remediation/productivity engine is configured to:
receive, from the support service system via the remediation wireless communications, the remediation module; and
install the remediation module on the IHS.

10. The IHS of claim 7, wherein the at least one productivity application includes at least one of a productivity suite application, an Internet browser application, and a file-sharing/storage application.

11. The IHS of claim 7, wherein the first network slice is isolated from the second network slice.

12. The IHS of claim 7, wherein the network slice remediation/productivity engine is configured to:
configure, in response to performing the remediation operations while operating in the pre-boot environment, an ability to transition to operating in the runtime environment; and
cause a transition from operating in the pre-boot environment to operating in the runtime environment.

13. The IHS of claim 7, further comprising:
a Basic Input/Output System (BIOS) that includes the memory system and the processing system, and that operates to provide the network slice remediation/productivity engine.

14. A method for providing for productivity with an endpoint computing device while remediating issues with that endpoint computing device, comprising:
determining, by an endpoint computing device while operating in an endpoint computing device pre-boot environment, an inability to transition to operating in an endpoint computing device runtime environment and, in response:
establishing, by the endpoint computing device, a remediation network connection with a first network slice included in a plurality of network slices that are available via a Radio Access Network (RAN) system;
establishing, by the endpoint computing device, a productivity network connection with a second network slice included in the plurality of network slices that are available via the RAN system;
performing, by the endpoint computing device using a remediation module included on the endpoint computing device and via remediation wireless communications over the remediation network connection with the first network slice, remediation operations with a support service system that is logged into the endpoint computing device via the remediation module;
connecting, by the endpoint computing device, to a productivity service subsystem via productivity wireless communications over the productivity network connection with the second network slice;
authenticating, by the endpoint computing device, with the productivity service subsystem to access at least one productivity application; and
performing; by the endpoint computing device using the at least one productive application and while performing the remediation operations using the remediation module, productivity operations.

15. The method of claim 14, wherein the determining the inability to transition to operating in the endpoint computing device runtime environment includes determining an inability initialize an operating system that is available on the endpoint computing device.

16. The method of claim 14, further comprising:
receiving, by the endpoint computing device from the support service system via the remediation wireless communications, the remediation module; and
installing, by the endpoint computing device, the remediation module on the endpoint computing device.

17. The method of claim 14, wherein the at least one productivity application includes at least one of a productivity suite application, an Internet browser application, and a file-sharing/storage application.

18. The method of claim 14, wherein the first network slice is isolated from the second network slice.

19. The method of claim 14, further comprising:
configuring, by the endpoint computing device in response to performing the remediation operations while operating in the endpoint computing device pre-boot environment, an ability to transition to operating in the endpoint computing device runtime environment; and
transitioning, by the endpoint computing device, from operating in the endpoint computing device pre-boot environment to operating in the endpoint computing device runtime environment.

20. The method of claim 14, wherein the endpoint computing device includes a Basic Input/Output System (BIOS) that operates to provide access to at least one productivity application.

* * * * *